(12) United States Patent
Amimoto et al.

(10) Patent No.: US 7,367,374 B2
(45) Date of Patent: May 6, 2008

(54) MANUFACTURING METHOD AND MANUFACTURING APPARATUS OF DISPLAY DEVICE

(75) Inventors: Toshiyuki Amimoto, Mobara (JP); Tetsuya Takei, Mobara (JP); Toshihiko Saitou, Mobara (JP); Tetsuo Matsuzaki, Ohara (JP)

(73) Assignees: Hitachi Displays, Ltd., Chiba-ken (JP); Hitachi Display Devices, Ltd., Chiba-ken (JP); Hitachi Display Technologies, Ltd., Chiba-ken (JP)

( * ) Notice: Subject to any disclaimer, the term of this patent is extended or adjusted under 35 U.S.C. 154(b) by 226 days.

(21) Appl. No.: 10/994,482

(22) Filed: Nov. 23, 2004

(65) Prior Publication Data

US 2005/0109457 A1    May 26, 2005

(30) Foreign Application Priority Data

Nov. 26, 2003    (JP)    ............................. 2003-395017

(51) Int. Cl.
    *B32B 37/18*    (2006.01)
(52) U.S. Cl. ...................................... 156/556; 156/539
(58) Field of Classification Search ............... 156/540, 156/543, 556, 517, 521, 539
    See application file for complete search history.

(56) References Cited

U.S. PATENT DOCUMENTS

| 4,557,783 | A | * | 12/1985 | Grone et al. ................. 156/257 |
| 5,106,450 | A | * | 4/1992 | Freisitzer et al. ........... 156/517 |
| 5,458,715 | A | * | 10/1995 | Takeuchi et al. ............ 156/241 |
| 5,607,540 | A | * | 3/1997 | Onishi ..................... 156/379.8 |
| 5,733,410 | A | * | 3/1998 | Gore et al. ................. 156/556 |
| 6,601,629 | B2 | * | 8/2003 | Toyoda et al. .............. 156/540 |
| 6,796,353 | B2 | * | 9/2004 | Lang et al. ................. 156/556 |
| 2003/0064592 | A1 | * | 4/2003 | Yamamoto ................... 438/689 |
| 2003/0133762 | A1 | * | 7/2003 | Yamamoto et al. ......... 406/198 |
| 2004/0026020 | A1 | * | 2/2004 | Kasperchik et al. ........ 156/230 |
| 2004/0051433 | A1 | | 3/2004 | Imai et al. |
| 2004/0169809 | A1 | | 9/2004 | Yamabuchi et al. |

FOREIGN PATENT DOCUMENTS

| JP | 05-005878 | 6/1991 |
| JP | 06-308444 | 4/1993 |
| JP | 06-034779 | 5/1993 |
| JP | 08-282906 | 4/1995 |
| JP | 2000-204304 | 1/1999 |
| JP | 2002-182031 | 12/2000 |
| JP | 2003-161835 | 7/2002 |

* cited by examiner

*Primary Examiner*—Mark A Osele
(74) *Attorney, Agent, or Firm*—Reed Smith LLP; Stanley P. Fisher, Esq.; Juan Carlos A. Marquez, Esq.

(57) ABSTRACT

The present invention is directed to a display device that overcomes the limitation on tact time, and the defective phenomenon attributed to the generation of bubbles, pasting and visual irregularities at the time of laminating a film to a display panel. A polarizer is positioned in parallel to the vicinity of a main surface of a liquid crystal cell by holding two portions of the polarizer at suction stages. A portion of the polarizer is pushed and brought into contact with the main surface of the liquid crystal cell. From the portion of the polarizer, the polarizer is pushed to the main surface toward one end of the main surface along a first direction thereof. The polarizer is pushed to the main surface of the liquid crystal cell toward another end of the main surface in the first direction so as to laminate the polarizer to the main surface.

8 Claims, 14 Drawing Sheets

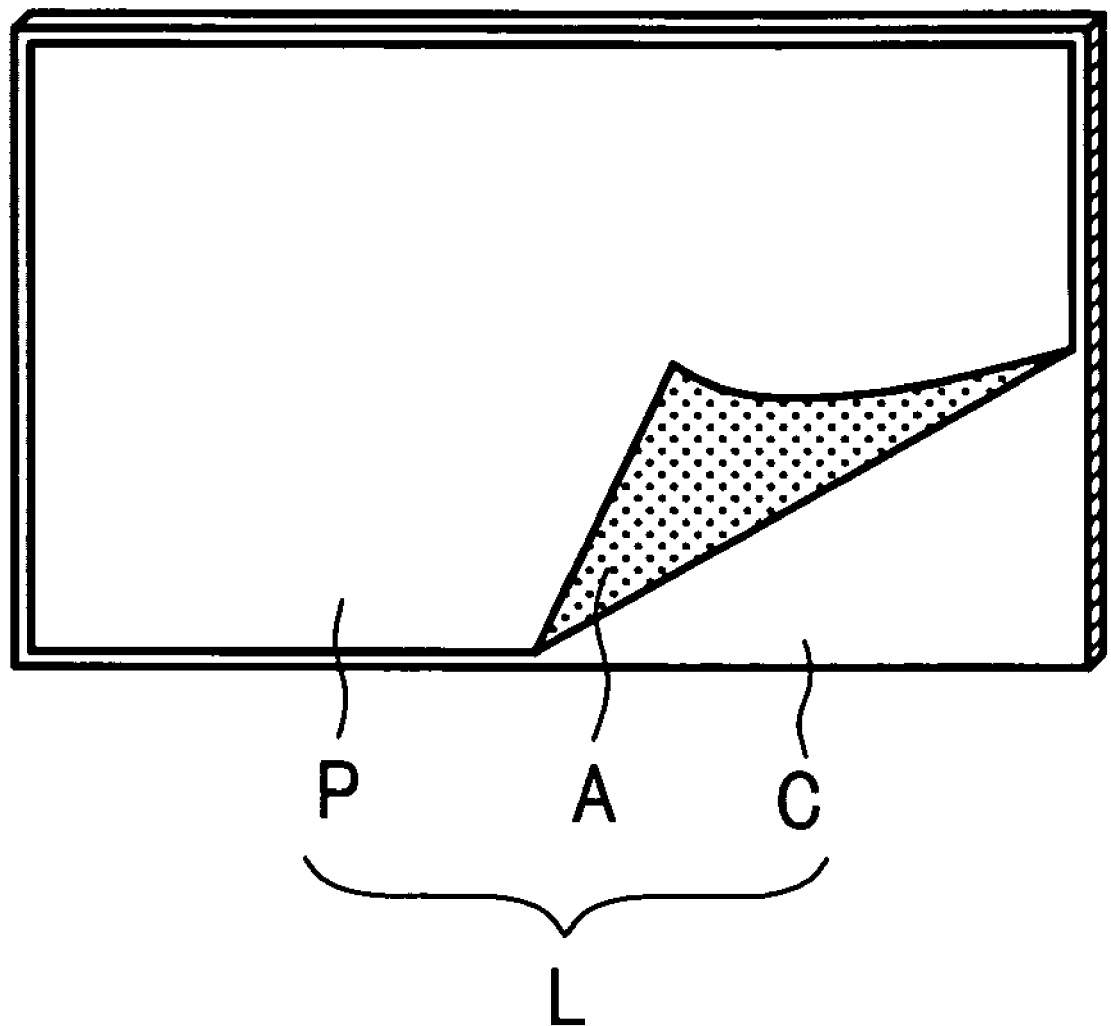

MANUFACTURING METHOD AND MANUFACTURING APPARATUS OF DISPLAY DEVICE

BACKGROUND OF THE INVENTION

The present invention relates to a manufacturing method and a manufacturing apparatus of a display device, and more particularly to a film lamination method and a film lamination apparatus which can realize an operation to laminate a soft film to a main surface of a display panel having a hard planer display screen with high accuracy and high efficiency.

As a conventional lamination method and lamination apparatus which laminates a film-like member to a main surface of a display panel, for example, which constitutes a member to be laminated, there has been known a method which laminates a polarizer film cut in a lamination step to a liquid crystal cell in a liquid crystal display device as described in patent document 1 (Japanese Patent Laid-Open No. 161935/2003).

In this lamination method, first of all, the polarizer film which is cut in a cutting step is transported to a position above the liquid crystal cell using a lamination head provided with a laminating roller, and the lamination head is lowered above the liquid crystal cell in a state that a side of the lamination head on which the laminating roller is mounted is inclined downwardly.

Next, at a point of time that one end of the polarizer film to which the laminating roller is pushed is brought into contact with one end of the liquid crystal cell having the substantially same shape as the polarizer film, the lowering of the laminating roller is stopped and, thereafter, the laminating roller which is brought into contact with the liquid crystal cell is rolled so as to laminate the polarizer film over the entire surface of the liquid crystal cell sequentially from one end to another end on the opposite side of the liquid crystal cell whereby the polarizer film is laminated to the entire surface of the liquid crystal cell. It has been generally known that this method is the most popular method as the method and the apparatus for laminating a film member to a member to be laminated.

Further, there has been also known a lamination method and a lamination apparatus which adopt a mode in which a liquid crystal cell is positioned above and a polarizer film is positioned below. However, basically, this mode is substantially equal to the mode described in patent literature 1 in which one end of the polarizer film is laminated to one end of the liquid crystal cell and the polarizer film is sequentially laminated to another end on the opposite side.

As known examples which describe the similar constitutions, patent document 2 (Japanese Patent Laid-Open Hei06-347779), patent document 3 (Japanese Patent Laid-Open Hei06-308444), patent document 4 (Japanese Patent Laid-Open Hei05-5878) and the like are named.

Further, in patent document 5 (Japanese Patent Laid-Open No. 204304/2000) and patent document 6 (Japanese Patent Laid-Open No. 182031/2002), embodiments in which a laminating roller is constituted of a semi-cylindrical member are respectively described. In the method described in these patent document 5 and patent document 6, one end of the polarizer film is laminated to one end of the liquid crystal cell using one end of the semi-cylindrical member and, thereafter, the polarizer film is rolled on the liquid crystal cell along a cylindrical curved surface of the semi-cylindrical member and hence, the polarizer film is sequentially laminated to the liquid crystal cell. From a viewpoint that the polarizer film is laminated to the entire surface of the liquid crystal cell from one end of the liquid crystal cell sequentially, these methods are substantially equal to the method and apparatus described in patent document 1 in which one end of the polarizer film is laminated to one end of the liquid crystal cell and, then, the lamination is sequentially performed toward another end on the opposite side. Here, with respect to this type of prior art, patent document 7 (Japanese Patent Laid-Open Hei08-282906) is named.

BRIEF SUMMARY OF THE INVENTION

In the above-mentioned method which constitutes the related art in which one end of the polarizer film is laminated to one end of the liquid crystal cell and, thereafter, the lamination film is laminated sequentially toward another end on the opposite side, when a liquid crystal display element is relatively small such that the liquid crystal display device is used in an application where the liquid crystal display element is used on a display screen of a mobile phone, there exists no problem with respect to the production speed. However, with respect to a large-sized liquid crystal display device which has a screen size of approximately nominal 30 inches or the like, there has been a drawback that a tact time of the lamination apparatus is prolonged. This is because the lamination speed of the polarizer film is a factor which largely influences the lamination quality of the polarizer film. That is, when the lamination speed is excessively high, a static electricity quantity is increased and hence, dusts in the atmosphere may be trapped between the polarizer film and the liquid crystal cell during the laminating operation.

Further, when the lamination speed is excessively high, it is impossible to purge air between the polarizer film and the liquid crystal cell thus forming bubbles. These dusts and bubbles lead the liquid crystal display elements which contain them into a category of defective products and hence, the inclusion of the dusts and bubbles must be strictly inhibited in the manufacturing process. Due to this reason, there has been a drawback that the method of the related art has a limit with respect to the speeding up of the tact time of the large-sized liquid crystal display device.

Further, in the above-mentioned method which constitutes the related art where one end of the polarizer film is laminated to one end of the liquid crystal cell and, thereafter, the polarizer film is sequentially laminated toward another end on the opposite side, at the time of pushing the polarizer film to the liquid crystal cell using the laminating roller or the semi-cylindrical member which constitutes the lamination means firstly, one end of the laminating roller or the semi-cylindrical member to which the polarizer film is laminated at the beginning of the lamination is small or narrow compared to the size and an operational width of the lamination apparatus and hence, the laminating roller or the semi-cylindrical member cannot hold the polarizer film at the time of lamination whereby there has been a drawback that fine bubbles are liable to easily intrude between the polarizer film and the liquid crystal cell at the lamination starting position.

Although this drawback can be completely ignored when the display surface of the liquid crystal display device which constitutes a product is larger than the size of the liquid crystal cell and end portions of the liquid crystal cell do not appear on the display surface of the liquid crystal display device. However, as the miniaturization of the liquid crystal display device progresses and the size of display surface of the liquid crystal display device and the size of the liquid crystal cell become substantially equal, the bubbles appear on the display surface of the liquid crystal display device which constitutes a product and these bubbles deteriorate the liquid crystal display function.

Further, in the above-mentioned method which constitutes the related art where one end of the polarizer film is laminated to one end of the liquid crystal cell and, thereafter, the polarizer film is sequentially laminated toward another end on the opposite side, at the time of pushing the polarizer film to the liquid crystal cell using the laminating roller or the semi-cylindrical member which constitutes the lamination apparatus firstly, one end of the laminating roller or the semi-cylindrical member to which the polarizer film is laminated at the beginning of the lamination is required to set a distance between a position where the lamination apparatus comes into contact with the polarizer film and the end of the polarizer film as short as possible to completely laminate the polarizer film to the liquid crystal cell.

Accordingly, there has been a drawback that a so-called "pasting" phenomenon arises. That is, at a point where the lamination apparatus brings the polarizer film and the liquid crystal cell into contact with each other firstly, an adhesive material which is applied to the polarizer film projects from the polarizer film due to an impact force and is adhered to the lamination means and, thereafter, the adhesive material is transferred to a plurality of places of the same polarizer film or a plurality of polarizer films with respect to the polarizer film during the laminating operation.

Further, in the above-mentioned related art, there has been also a drawback that at a point where the lamination means brings the polarizer film and the liquid crystal cell into contact with each other firstly, a thickness of the polarizer film is delicately changed due to an impact force thus giving rise to a defect that the change appears as visual irregularities on a contact point in a liquid crystal display element.

Accordingly, the present invention has been made to overcome the above-mentioned drawbacks of the related art and it is an object of the present invention to provide a manufacturing method and a manufacturing apparatus of a display device which can overcome the limitation on a tact time, and a defective phenomenon attributed to the generation of bubbles, pasting and visual irregularities which are the above-mentioned drawbacks at the time of laminating a film-like member to a display panel which constitutes a member to be laminated thus manufacturing a display device having no bubbles, pasting and visual irregularities at a high speed.

To achieve such an object, according to the present invention, there is provided a manufacturing method of a display device which includes a display panel having a main surface which extends in the first direction and in the second direction which intersects the first direction and which laminates a film on the main surface of the display panel, wherein the film is positioned in the vicinity of and parallel to the main surface of the display panel in a state that at least two portions of the film are held and, thereafter, a portion of the film is brought into pressure contact with the main surface of the display panel and, thereafter, the film is pushed to the main surface of the display panel from one portion of the film toward one end of the main surface of the display panel in the first direction of the main surface of the display panel and, thereafter, the film is pushed to the main surface of the display panel toward another end of the main surface of the display panel in the first direction whereby the film is laminated to the main surface of the display panel thus achieving the lamination which does not generate bubbles, pasting and the visual irregularities.

Further, to achieve such an object, according to the present invention, there is provided a manufacturing apparatus of a display device which includes a display panel having a main surface which extends in the first direction and in the second direction which intersects the first direction and which laminates a film on the main surface of the display panel, wherein the manufacturing apparatus includes display panel holding means which holds the display panel by way of a back surface thereof opposite to the main surface thereof and moves the display panel in the first direction; a pair of film holding means which is arranged to face the display panel holding means in an opposed manner, includes a first holding portion and second holding portion which hold the film on a back surface of a laminating surface thereof at at least two positions on a coplanar plane, and allows the first holding portion and the second holding portion to move along the coplanar plane; and at least one laminating means which is arranged between the pair of film holding means consisting of the first holding portion and the second holding portion, brings a portion of the film into contact with the main surface of the display panel, is moved in a reciprocating manner along the main surface of the display panel in synchronism with the movement of the first holding portion and the second holding portion, wherein after the portion of the film is brought into contact with the main surface of the display panel, the laminating means is moved along the main surface of the display panel in the first direction toward one end of the main surface of the display panel and, thereafter, the laminating means is moved along the main surface of the display panel in the first direction toward another end of the main surface of the display panel whereby the film is laminated to the main surface of the display panel thus achieving the laminating operation which does not generate bubbles, pasting, and the visual irregularities.

Further, in the above-mentioned constitution of the manufacturing apparatus of the display device, by forming the laminating means into a curved surface or a portion thereof of a cylindrical roller which is rotatable in the first direction or a tiltable cylinder in the first direction, it is possible to achieve the laminating operation which does not generate bubbles, pasting and the visual irregularities.

Further, in the above-mentioned constitution of the manufacturing apparatus of the display device, by setting an angle at which the laminating means brings the film into pressure contact with the main surface of the display panel to approximately 45 degrees or less with respect to the main surface of the display panel, it is possible to achieve the laminating operation which does not generate bubbles, pasting and the visual irregularities.

Here, it is needless to say that the present invention is not limited to the above-mentioned respective constitutions and constitutions described in embodiments described later and various modifications are conceivable without departing from the technical concept of the present invention.

As described above, according to the manufacturing method of the display device of the present invention, it is possible to obtain an extremely excellent advantageous effect that the occurrence of a defect attributed to fine bubbles and a defect attributed to pasting at a lamination start point which takes place on a laminating surface between the display panel and the film can be eliminated.

Further, according to the manufacturing apparatus of the display device of the present invention, by providing a plurality of laminating means, it is possible to obtain an extremely excellent advantageous effect that, an operation to laminate the film to the display panel can be performed at a high lamination speed, that is, one half or less of a lamination speed of a conventional manufacturing apparatus.

Still further, according to the manufacturing apparatus of the display device of the present invention, by setting a radius of curvature of an operating surface of the laminating means to which the film is pushed to a large value and, at the same time, by setting an initial contact angle of the laminating means to approximately 45 degrees or less, it is possible to obtain an extremely excellent advantageous effect that the occurrence of a visual irregularities defect attributed to an initial impact force of the laminating means can be eliminated.

BRIEF DESCRIPTION OF THE SEVERAL VIEWS OF THE DRAWING

FIG. 1 is a perspective view for explaining the constitution of a display panel according to the present invention;

DETAILED DESCRIPTION OF THE INVENTION

Figure 2A:
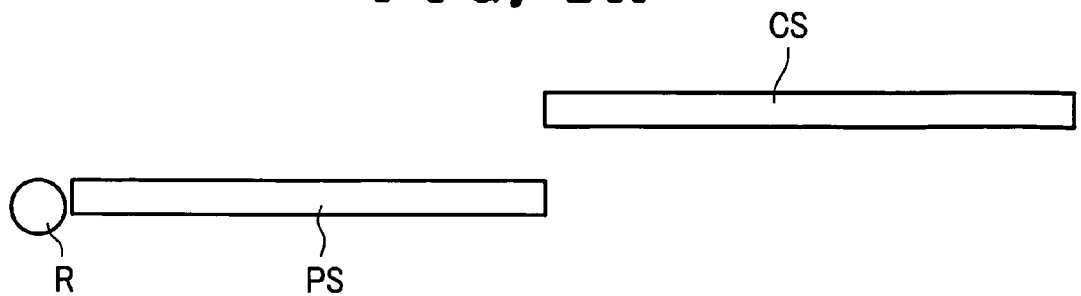
FIG. 2A is a cross-sectional view showing the constitution of a manufacturing apparatus used in a currently available manufacturing method of a display device.

Embodiments of the present invention are explained in detail hereinafter in conjunction with drawings which show the embodiments.

One embodiment of a manufacturing method and a manufacturing apparatus of a display device according to the present invention is explained in detail in conjunction with FIG. 1 to FIG. 9. FIG. 1 is a perspective view showing the schematic constitution of the display device according to the present invention. In FIG. 1, symbol L indicates, for example, a liquid crystal display element which constitutes the display device, symbol C indicates, for example, a glass-made liquid crystal cell (liquid crystal display panel) which has an image display screen, symbol P indicates, for example, a polarizer which is formed of a stacked body made of at least one resin thin film which constitutes a film laminated to a main surface of the liquid crystal cell C, and symbol A indicates an adhesive agent which is preliminarily applied to a laminating surface of the polarizer P.

With respect to a size of the glass-made liquid crystal cell C, a diagonal line length usually falls in a range from approximately one inch to approximately 40 inches or more. However, the laminating operation of the polarizer A according to the present invention is suitable for the lamination of the polarizer P to the large-sized liquid crystal cell C having the diagonal length of approximately 28 inches or more mainly. Further, with respect to the laminating operation of the polarizer P, while the rapid operation is necessary to enable the mass production of the display devices, the careful operation is required. This is because when the laminating operation is not performed carefully, there arise following defects. That is, a bubble defect which is caused by the intrusion of air clusters into a laminating main surface of the liquid crystal cell C, a pasting defect in which the adhesive agent A projects from an end portion of the polarizer P when the polarizer P is pushed with an excessively strong force, and a visual irregularities defect in which thicknesses of the polarizer P and the adhesive agent A become non-uniform when the polarizer P is pushed with an excessively strong force and stripes appear within a screen.

Hereinafter, for facilitating the understanding of the gist of the present invention, the currently available laminating method and the lamination apparatus are explained.

FIG. 2 is a cross-sectional view for explaining the currently available laminating method and lamination apparatus for laminating the polarizer P to the liquid crystal cell C. FIG. 2A to FIG. 2H are views for explaining the laminating steps. FIG. 2A is an explanatory view showing the positional relationship of the lamination apparatus before the liquid crystal cell C and the polarizer P are mounted on the lamination apparatus. As shown in FIG. 2A, at given positions in the inside of the lamination apparatus, a suction stage CS for the liquid crystal cell C and a suction stage PS for the polarizer P stand by in a parallel state. Further, at a left end of the suction stage PS for the polarizer P, a laminating roller R which pushes the polarizer P to the liquid crystal cell C at the time of performing the laminating operation is provided.

The liquid crystal cell C and the polarizer P stand by at positions which do not interfere with each other in the vertical direction such that the liquid crystal cell C and the polarizer P can be positioned and set on the respective suction stages CS, PS. Here, although the positioning and the setting of the liquid crystal cell C and the polarizer P are performed using mechanisms which are independent from each other (not shown in the drawing), the positioning and the setting may be performed manually.

Figure 2B:
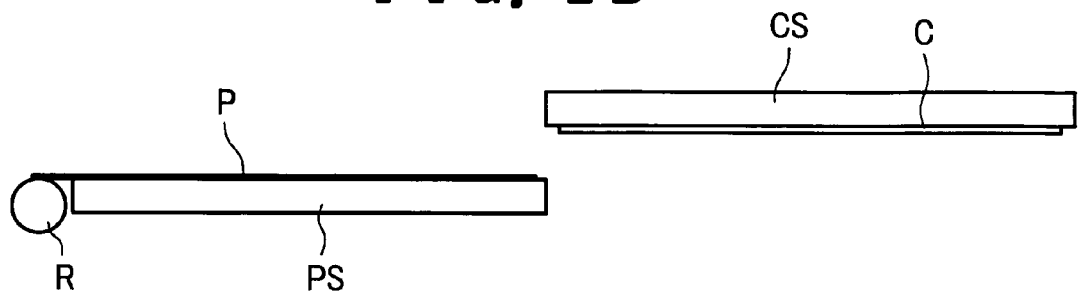
FIG. 2B is a cross-sectional view for explaining a currently available laminating method of a liquid crystal cell and a polarizer.
Figure 2C:
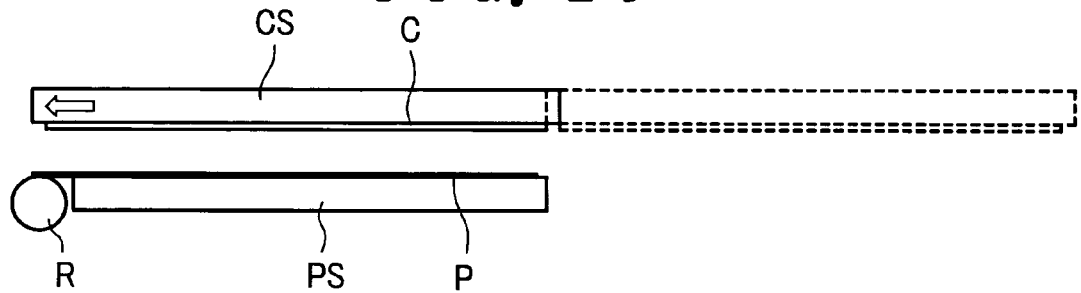
FIG. 2C is a cross-sectional view of a step succeeding a step shown in FIG. 2B.

First of all, as shown in FIG. 2B, the liquid crystal cell C is mounted on a lower portion of the suction stage CS and the polarizer P is mounted on an upper portion of the suction stage PS by vacuum suction respectively. The lamination start position of the polarizer P is positioned and set such that the lamination start position is aligned with a given position above the laminating roller R. Then, as shown in FIG. 2C, the suction stage CS which mounts the liquid crystal cell C thereon is moved in the left direction as indicated by an arrow to an upper given position of the suction stage PS which mounts the polarizer P thereon.

Figure 2D:
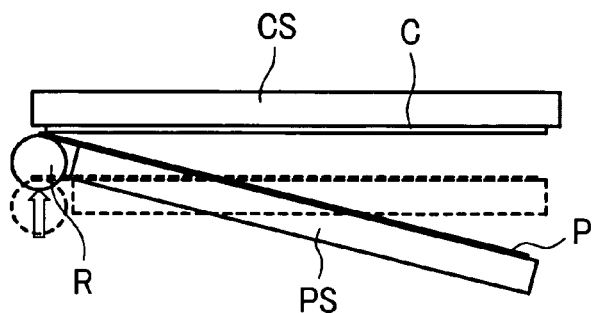
FIG. 2D is a cross-sectional view of a step succeeding a step shown in FIG. 2C.

Next, as shown in FIG. 2D, the suction stage PS which mounts the polarizer P thereon is inclined by a given angle so that the polarizer P is brought into contact with and is pushed to a left end of the liquid crystal cell C mounted on the suction stage CS which is positioned above the polarizer P by the laminating roller R mounted on a left end of the suction stage PS whereby the liquid crystal cell C and the polarizer P are laminated to each other in a narrow strip-like area.

Figure 2E:
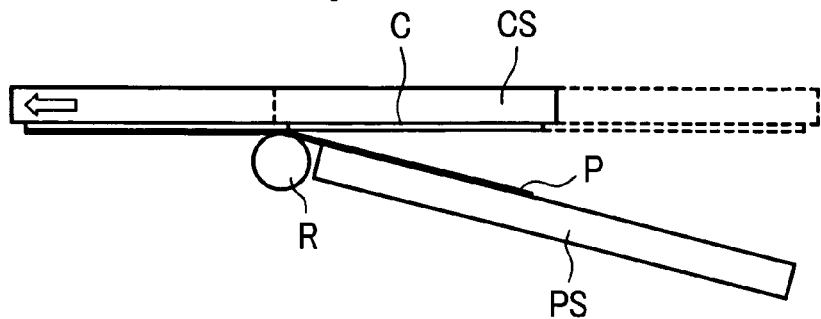
FIG. 2E is a cross-sectional view of a step succeeding a step shown in FIG. 2D.

Next, as shown in FIG. 2E, the suction stage CS which mounts the liquid crystal cell C thereon is moved in the left direction indicated by an arrow relative to the suction stage PS which is inclined while keeping the sucking of the polarizer P. Here, since the liquid crystal cell C and the polarizer P have respective end portions thereof bonded to each other at the beginning, the respective laminating surfaces of the liquid crystal cell C and the polarizer P are bonded to each other in synchronism with the movement of the suction stage CS.

Figure 2F:
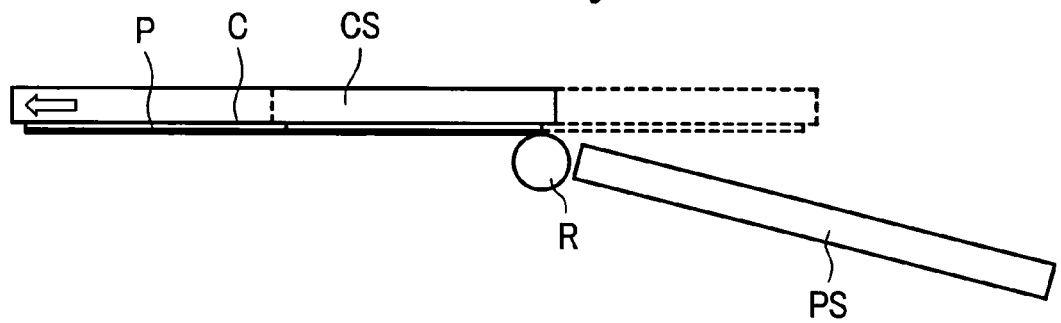
FIG. 2F is a cross-sectional view of a step succeeding a step shown in FIG. 2E.

To prevent a phenomenon that air is retained between the liquid crystal cell C and the polarizer P so as to form bubbles, the laminating roller R is rotated in synchronism with the movement of the suction stage CS in the left direction indicated by an arrow so as to push the polarizer P to the liquid crystal cell C. Since the lamination is performed by applying a proper tension to the polarizer P during such an operation, as shown in FIG. 2F, along with the movement of the suction stage CS, the polarizer P slides on the suction stage PS. Here, a suction force of the suction stage PS with respect to the polarizer P is preliminarily adjusted to a level that the suction stage PS does not damage the polarizer P.

Further, if no significant problem arises in terms of quality, after the liquid crystal cell C and the polarizer P are laminated with each other with the narrow strip-like area as shown in FIG. 2D, the suction may be released. Further, it is possible to dynamically control the suction force by mounting a sensor such that a proper tension is applied to the polarizer P.

Figure 2G:
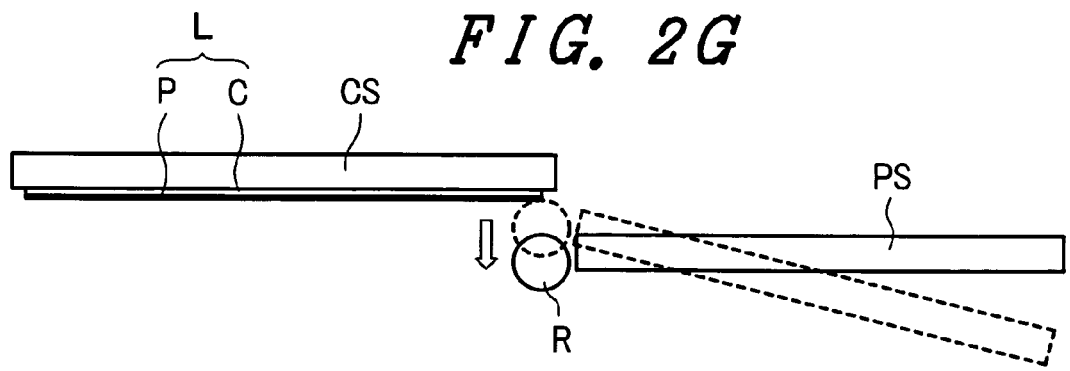
FIG. 2G is a cross-sectional view of a step succeeding a step shown in FIG. 2F.
Figure 2H:
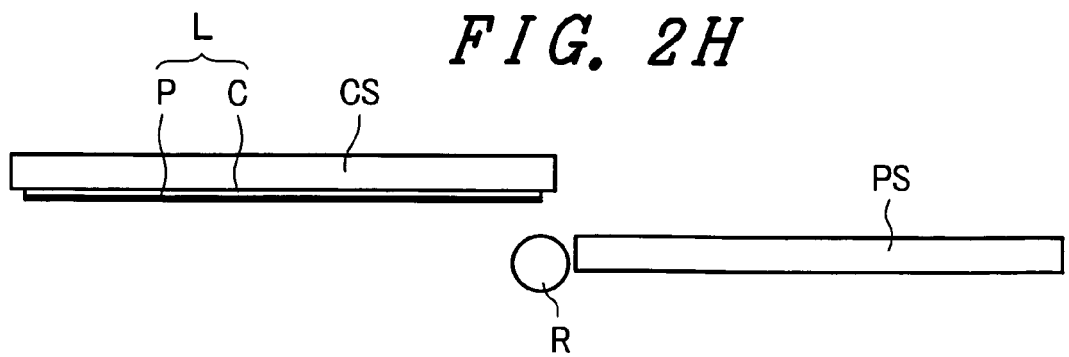
FIG. 2H is a cross-sectional view of a step succeeding a step shown in FIG. 2G.

Next, as shown in FIG. 2G, the lamination of the polarizer P to the liquid crystal cell C is finished to produce the liquid crystal display element L as a finished product. Thereafter, the suction stage PS which mounts the polarizer P thereon is returned in the downward direction indicated by an arrow to assume the horizontal position which is equal to the initial position and the laminating roller R is removed from the liquid crystal display element L. In such a state, as shown in FIG. 2H, the liquid crystal display element L is discharged using an unloader (not shown in the drawing). This operation may be also performed manually. Thereafter, the suction stages CS, PS are returned to the above-mentioned initial positions shown in FIG. 2A and the lamination of next liquid crystal cell C and polarizer P is performed.

In this manner, with respect to the currently available laminating method and lamination apparatus, the laminating speed of the polarizer P is a factor which decides the lamination quality and hence, when the liquid crystal display device is particularly large-sized, the production speed cannot be increased whereby the lamination speed has been a cause which hampers the mass productivity. This is because when the lamination is performed excessively speedily, there exists a possibility that dusts or bubbles are entangled between the liquid crystal cell C and the polarizer P.

Further, with respect to the currently available laminating method and laminating mechanism, it is impossible to hold the polarizer P at the lamination start position and hence, there has been a drawback that fine bubbles are liable to easily intrude between the liquid crystal cell C and the polarizer P at the lamination start position or a drawback which is referred to as "pasting" in which an adhesive agent A which is applied to a back surface of the polarizer P easily projects outside.

Further, with respect to the currently available laminating method and lamination apparatus, at the point where the liquid crystal cell C and the polarizer P are brought into contact with each other at the beginning, there arises a drawback that a thickness of the polarizer P is changed due to an impact applied at the time of contacting thus generating so-called visual irregularities on a display screen.

Figure 3:
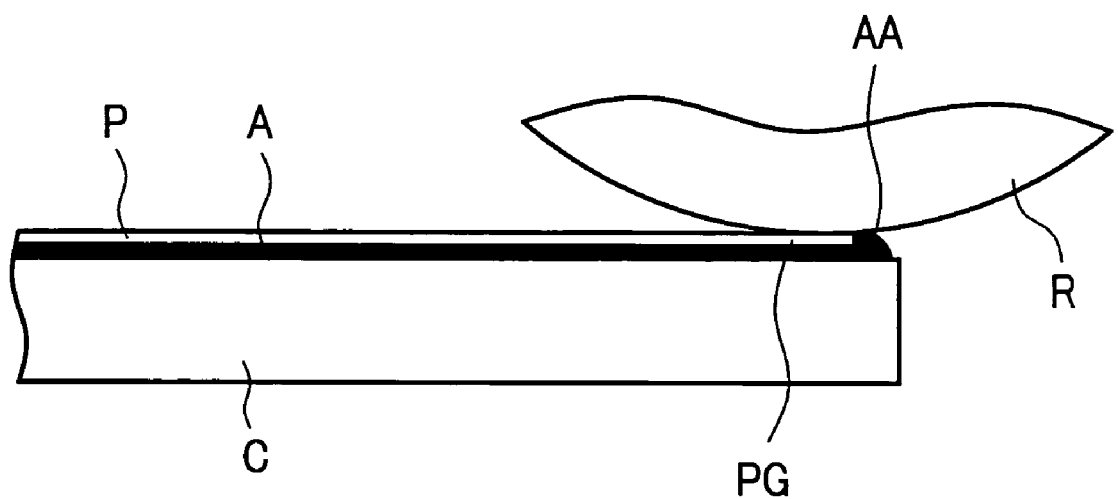
FIG. 3 is a cross-sectional view for explaining an occurrence state of a pasting defect or a visual irregularities defect which occur when the liquid crystal cell and the polarizer are laminated to each other using the currently available laminating method.

FIG. 3 is a cross-sectional view for explaining an occurrence state of a pasting defect and a visual irregularities defect which occur when the liquid crystal cell C and the polarizer P are laminated to each other using the currently available laminating method. As shown in FIG. 3, the adhesive agent A is preliminarily applied to the polarizer P and the liquid crystal cell C and the polarizer P are bonded to each other by way of the adhesive agent A. When the laminating roller R pushes an end portion of the polarizer P to an end portion of the liquid crystal cell C, due to a pushing force of the laminating roller R, there exists a possibility that a portion of the adhesive agent A projects from the end portion of the polarizer P thus forming a pasting portion AA. When the pasting portion AA is adhered to the laminating roller R, the adhesive agent A is transferred to a surface of the polarizer P at a pitch corresponding to the outer circumference of the laminating roller R.

Further, in the initial laminating step of the liquid crystal cell C and the polarizer P, due to the pushing force of the laminating roller R, there exists a possibility that thicknesses of the polarizer P and the adhesive agent A are changed and hence, when an indentation PG is formed, this appears as visual irregularities on the display screen.

Embodiment 1

FIG. 4 is a cross-sectional view for explaining a laminating method and a lamination apparatus for laminating a liquid crystal cell C and a polarizer P which constitutes one embodiment of a manufacturing method and a manufacturing apparatus of a display device according to the present invention, wherein FIG. 4A to FIG. 4H show laminating steps.

Figure 4A:
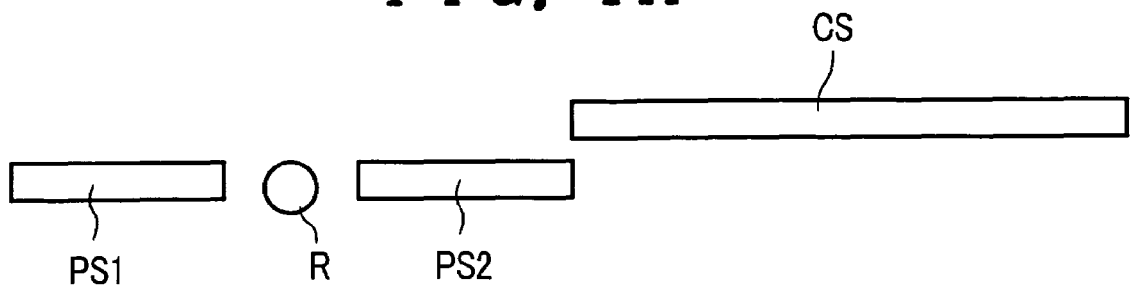
FIG. 4A is a cross-sectional view showing the constitution according to an embodiment 1 of a manufacturing apparatus used in a manufacturing method of a display device according to the present invention.

FIG. 4A is a cross-sectional view for explaining the positional relationship of the lamination apparatus before the liquid crystal cell C and the polarizer P are mounted on the lamination apparatus. As shown in FIG. 4A, at given positions in the inside of the lamination apparatus, a suction stage CS which is provided for holding the liquid crystal cell C and a suction stage PS1 and a suction stage PS2 which are provided for holding the polarizer P are arranged in a parallel state as well as in a standby state. Further, at the center of the suction stage PS1 and the suction stage PS2 for the polarizer P which are arranged in the parallel state, a laminating roller R which pushes the polarizer P to the liquid crystal cell C during the laminating operation is rotatably arranged.

Further, the liquid crystal cell C and the polarizer P are arranged at positions which do not interfere with each other in the vertical direction such that the liquid crystal cell C and the polarizer P can be positioned and set at the respective suction stages CS, PS1, PS2. Although the positioning and the setting of the liquid crystal cell C and the polarizer P are performed using respectively different mechanisms (not shown in the drawing), the positioning and setting may be performed manually.

Figure 4B:
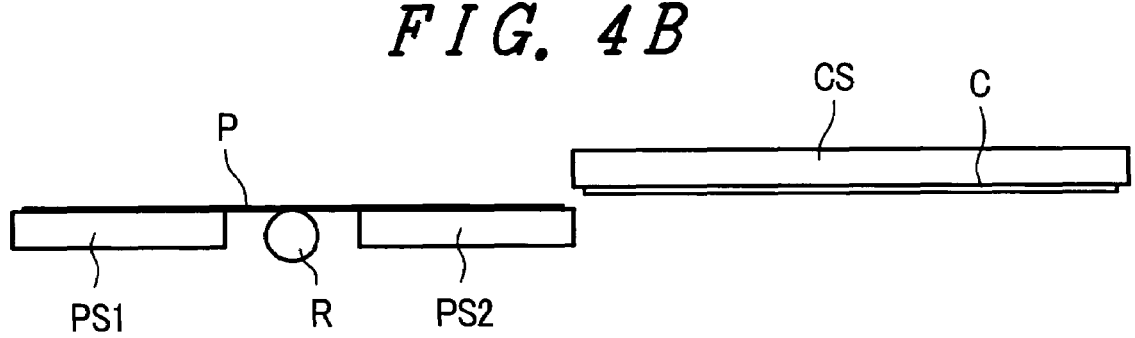
FIG. 4B is a cross-sectional view of a step for explaining a laminating method of a liquid crystal cell and a polarizer for explaining an embodiment 1 of the manufacturing method of the display device according to the present invention.
Figure 4C:
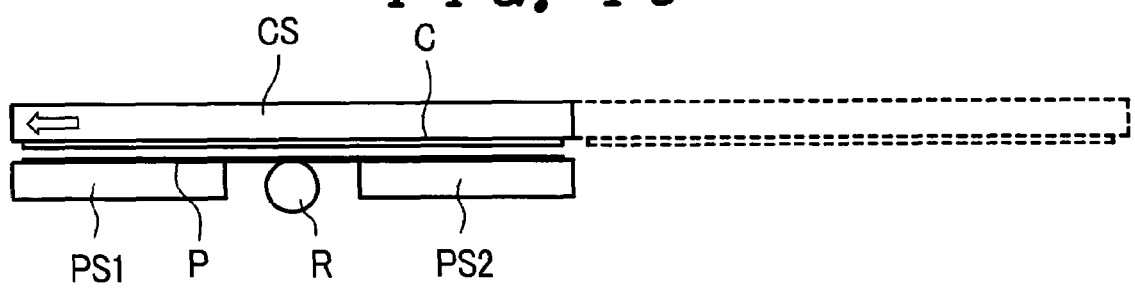
FIG. 4C is a cross-sectional view of a step succeeding a step shown in FIG. 4B.

First of all, as shown in FIG. 4B, the liquid crystal cell C is positioned and set at a given position below the suction stage CS and is further held and mounted on the suction stage CS by vacuum suction, while the polarizer P is positioned and set at a given position above the suction stages PS1, PS2 and the laminating roller R and is further held and mounted on the suction stages PS1, PS2. Next, as shown in FIG. 4C, the suction stage CS which mounts the liquid crystal cell C thereon is moved in the left direction as indicated by an arrow to a given position above the suction stages PS1, PS2 which mount the polarizer P thereon.

Figure 4D:
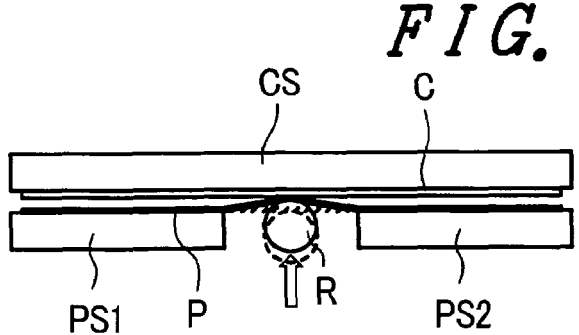
FIG. 4D is a cross-sectional view of a step succeeding a step shown in FIG. 4C.

Next, as shown in FIG. 4D, without moving the suction stages PS1, PS2 which mount the polarizer P thereon, using the laminating roller R which is positioned at the center between the suction stages PS1, PS2, the polarizer P is pushed and is brought into contact with the center of the liquid crystal cell C mounted on the suction stage CS which is arranged above the polarizer P so that the liquid crystal cell C and the polarizer P are laminated to each other in a narrow strip-like area.

Figure 4E:
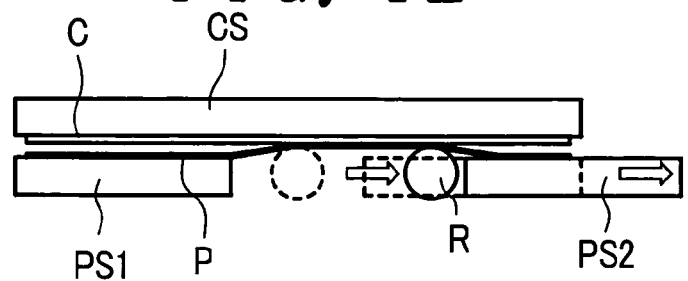
FIG. 4E is a cross-sectional view of a step succeeding a step shown in FIG. 4D.
Figure 4F:
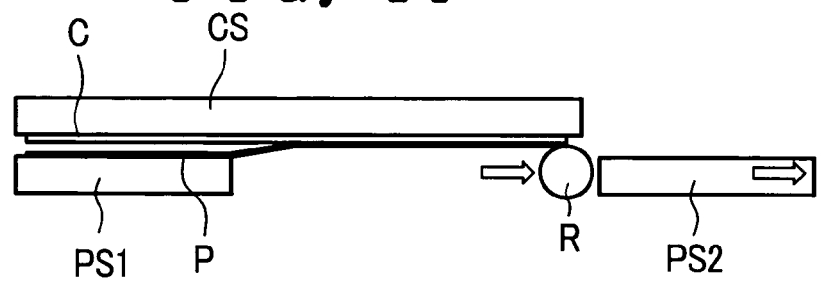
FIG. 4F is a cross-sectional view of a step succeeding a step shown in FIG. 4E.

Next, as shown in FIG. 4E, while fixing the position of the suction stage CS which mounts the liquid crystal cell C thereon, the laminating roller R and the suction stage PS2 which sucks a right half of the polarizer P are moved in the right direction indicated by an arrow. In such an operation, the polarizer P is gradually moved away from the suction stage PS2 while sliding on the suction stage PS2 and is eventually removed from the suction stage PS2 as shown in FIG. 4F so that the right half of the polarizer P is laminated to a right half of the liquid crystal cell C.

Here, a suction force of the suction stage PS2 with respect to the polarizer P is preliminarily adjusted to a level that the suction stage PS2 does not damage the polarizer P. Further, if there arises no significant problem in terms of quality, after the liquid crystal cell C and the polarizer P are laminated with each other with the narrow strip-like area, the suction may be released. Further, it is possible to dynamically control the suction force by mounting a sensor such that a proper tension is applied to the polarizer P. To prevent a phenomenon that air is retained between the liquid crystal cell C and the polarizer P so as to form bubbles, the laminating roller R is rotated in synchronism with the movement of the suction stage CS so as to push the polarizer P to the liquid crystal cell C.

Figure 4G:
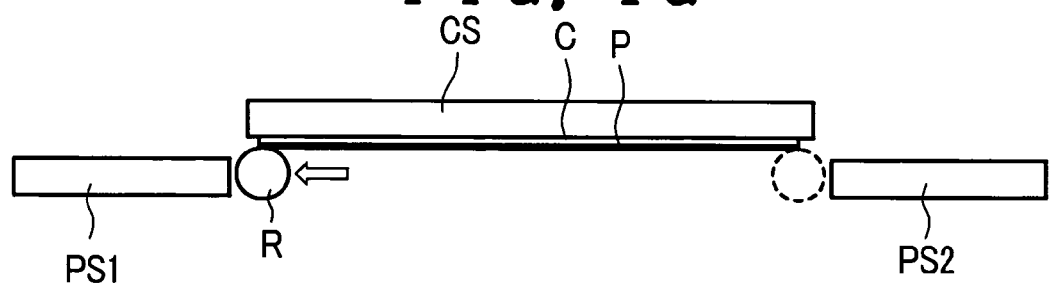
FIG. 4G is a cross-sectional view of a step succeeding a step shown in FIG. 4F.

Next, with respect to the laminating roller R which finishes the lamination of the right halves of the liquid crystal cell C and the polarizer P, as shown in FIG. 4G, the laminating roller R and the suction stage PS1 which sucks a left half of the polarizer P are moved in the left direction indicated by an arrow in the same posture. From a point of time that the laminating roller R gets over the vicinity of the center of the liquid crystal cell C, the laminating operation of the left halves of the liquid crystal cell C and the polarizer P is performed and the suction stage PS1 is moved in the right direction as indicated by an arrow.

Figure 4H:
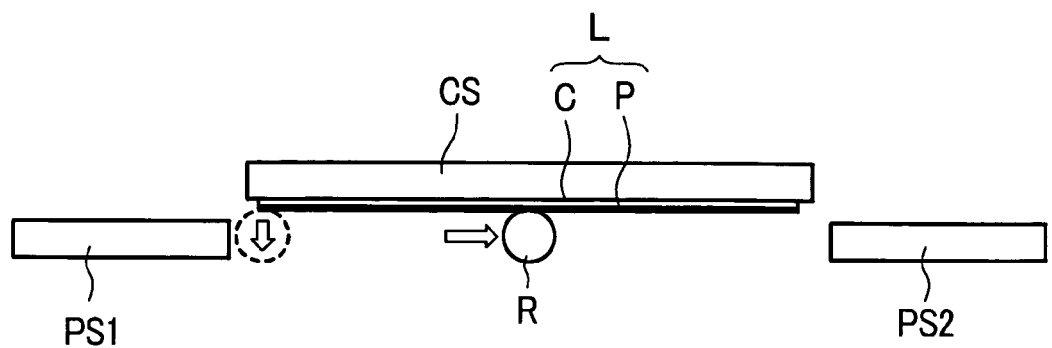
FIG. 4H is a cross-sectional view of a step succeeding a step shown in FIG. 4G.

Accordingly, the polarizer P is gradually moved away from the suction stage PS1 while sliding on the suction stage PS1 and the laminating roller R is eventually removed from the suction stage PS1 as shown in FIG. 4H so that the left half of the polarizer P is laminated to the left half of the liquid crystal cell C whereby the lamination step is finished. During such an operation, since the lamination is performed while applying the proper tension to the polarizer P, the polarizer P slides on the suction stage PS1 along with the movement of the suction stage CS. In this manner, the lamination of the polarizer P to the liquid crystal cell C is finished to produce the liquid crystal display element L as a finished product. Thereafter, the laminating roller R is removed from the liquid crystal display element L. In such a state, although the liquid crystal display element L is discharged using an unloader (not shown in the drawing), this operation may be also performed manually. Thereafter, the lamination apparatus is returned to the initial positions shown in FIG. 4A and the lamination of next liquid crystal cell C and polarizer P is performed.

According to this laminating method, the polarizer P is positioned in the vicinity of the main surface of the liquid crystal cell C while holding two portions consisting of the suction stage PS1 and the suction stage PS2. Then, the laminating roller R is pushed to the center between the suction stage PS1 and the suction stage PS2 which hold the polarizer P to bring the portion of the polarizer P into contact with the center of the liquid crystal cell C thus laminating the portion of the polarizer P to the liquid crystal cell C. Thereafter, the laminating roller R is moved in one direction and the direction opposite to one direction along the laminating surface of the liquid crystal cell C so as to laminate the polarizer P to the liquid crystal cell C. Accordingly, it is possible to reduce the occurrence of defects such as the defect attributed to the fine bubbles at the lamination start position, the defect attributed to the pasting and the like among the drawbacks which are liable to occur in the currently available laminating method.

Embodiment 2

FIG. 5 is a cross-sectional view for explaining another embodiment of the laminating method and the lamination apparatus for laminating the polarizer P to the liquid crystal cell C in the manufacturing method and the manufacturing apparatus of the display device according to the present invention, wherein FIG. 5A to FIG. 5H show laminating steps. This embodiment is provided for enhancing the tack time compared to the embodiment 1 explained in conjunction with FIG. 4.

Figure 5A:
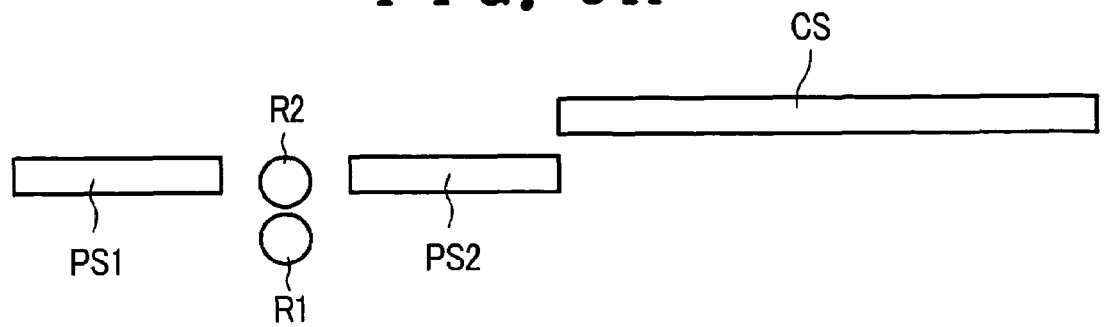
FIG. 5A is a cross-sectional view showing the constitution according to an embodiment 2 of a manufacturing apparatus used in a manufacturing method of a display device according to the present invention.

FIG. 5A is a cross-sectional view for explaining the positional relationship of the lamination apparatus before the liquid crystal cell C and the polarizer P are mounted on the lamination apparatus which constituted an embodiment 2 of the present invention. As shown in FIG. 5A, at given positions in the inside of the lamination apparatus, a suction stage CS which is provided for mounting the liquid crystal cell C thereon and a suction stage PS1 and a suction stage PS2 which are provided for mounting the polarizer P thereon are arranged in a parallel state as well as in a standby state.

Further, at the center of the suction stage PS1 and the suction stage PS2 for the polarizer P, a laminating roller R1 and a laminating roller R2 which push the polarizer P to the liquid crystal cell C during the laminating operation are arranged in the vertical direction. Further, the liquid crystal cell C and the polarizer P are arranged at positions which do not interfere with each other in the vertical direction such that the liquid crystal cell C and the polarizer P can be positioned and set at the respective suction stages CS, PS1, PS2. Although the positioning and the setting of the liquid crystal cell C and the polarizer P are performed using respectively different mechanisms (not shown in the drawing), the positioning and setting may be performed manually.

Figure 5B:
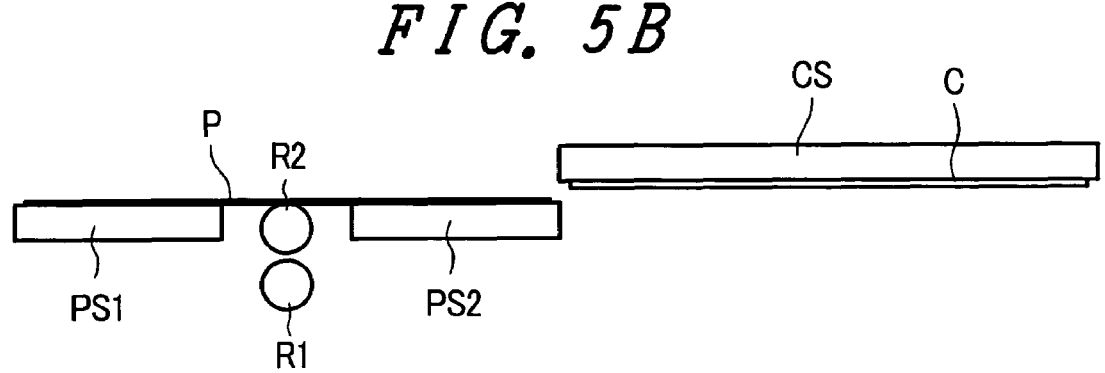
FIG. 5B is a cross-sectional view for explaining a laminating method of a liquid crystal cell and a polarizer for explaining an embodiment 2 of the manufacturing method of the display device according to the present invention.
Figure 5C:
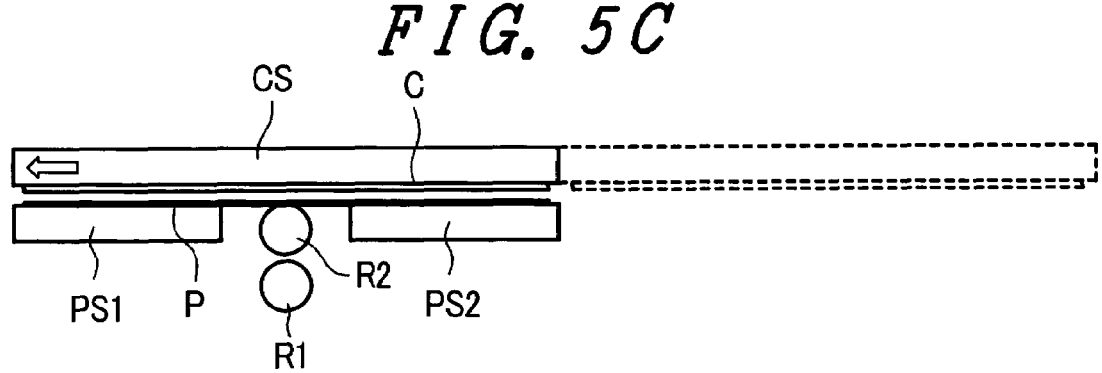
FIG. 5C is a cross-sectional view of a step succeeding a step shown in FIG. 5B.

First of all, as shown in FIG. 5B, the liquid crystal cell C is positioned and set at a given position below the suction stage CS and is further held and mounted on the suction stage CS by vacuum suction, while the polarizer P is positioned and set at a given position above the suction stages PS1, PS2 and the laminating roller R2 and is further held and mounted on the suction stages PS1, PS2. Next, as shown in FIG. 5C, the suction stage CS which mounts the liquid crystal cell C thereon is moved to a given position above the suction stages PS1, PS2 which mount the polarizer P thereon.

Figure 5D:
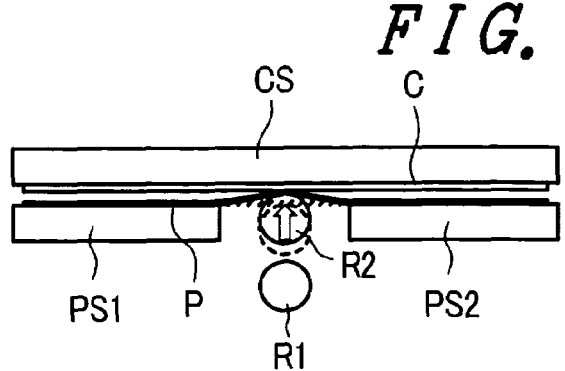
FIG. 5D is a cross-sectional view of a step succeeding a step shown in FIG. 5C.

Next, as shown in FIG. 5D, without moving the suction stages PS1, PS2 which mount the polarizer P thereon, using the laminating roller R2 which is positioned at the center between the suction stages PS1, PS2, the polarizer P is pushed and is brought into contact with the center of the liquid crystal cell C mounted on the suction stage CS which is arranged above the polarizer P so that the liquid crystal cell C and the polarizer P are laminated to each other in a narrow strip-like area.

Figure 5E:
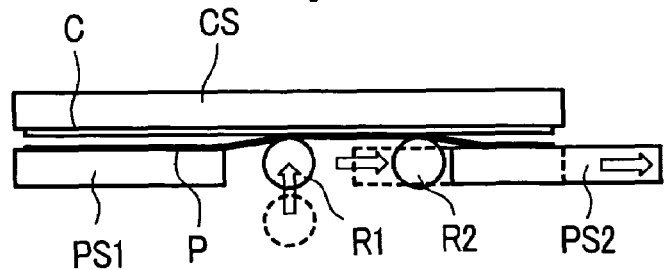
FIG. 5E is a cross-sectional view of a step succeeding a step shown in FIG. 5D.

Next, as shown in FIG. 5E, while fixing the position of the suction stage CS which mounts the liquid crystal cell C thereon, the laminating roller R2 and the suction stage PS2 which sucks a right half of the polarizer P are moved in the right direction indicated by an arrow. In such an operation, the polarizer P is gradually moved away from the suction stage PS2 while sliding on the suction stage PS2 and is eventually removed from the suction stage PS2 so that the right half of the polarizer P is laminated to a right half of the liquid crystal cell C. During that period, to perform the lamination while applying a proper tension to the polarizer P, the polarizer P slides on the suction stage PS2 along with the movement of the suction stage CS.

Figure 5F:
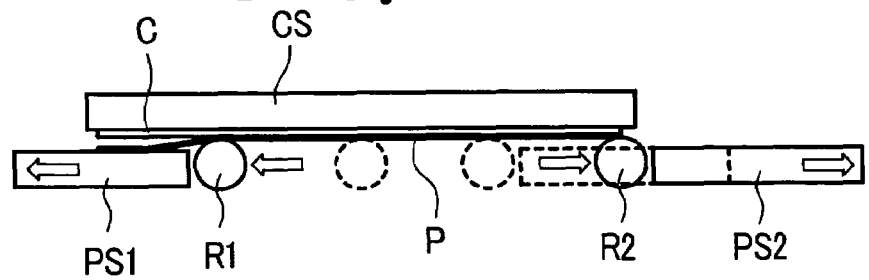
FIG. 5F is a cross-sectional view of a step succeeding a step shown in FIG. 5E.

From the midst of the laminating operation in which the laminating roller R2 laminates the right halves of the liquid crystal cell C and the polarizer P in this manner, the laminating roller R1 is lifted to a given position and is moved in the left direction as indicated by an arrow together with the suction stage PS1 which sucks a left half of the polarizer P as shown in FIG. 5F. Here, the polarizer P is gradually moved away from the suction stage PS1 while sliding on the suction stage PS1 and is eventually removed from the suction stage PS1 so that the left half of the polarizer P is laminated to a left half of the liquid crystal cell C whereby the laminating step is finished.

Here, a suction force of the suction stage PS2 with respect to the polarizer P is preliminarily adjusted to a level that the suction stage PS2 does not damage the polarizer P. Further, if there arises no significant problem in terms of quality, after the liquid crystal cell C and the polarizer P are laminated with each other with the narrow strip-like area, the suction may be released. Further, it is possible to dynamically control the suction force by mounting a sensor such that a proper tension is applied to the polarizer P. To prevent a phenomenon that air is retained between the liquid crystal cell C and the polarizer P so as to form bubbles, the laminating rollers R1, R2 are rotated in synchronism with the movement of the suction stage CS so as to push the polarizer P to the liquid crystal cell C.

Figure 5G:
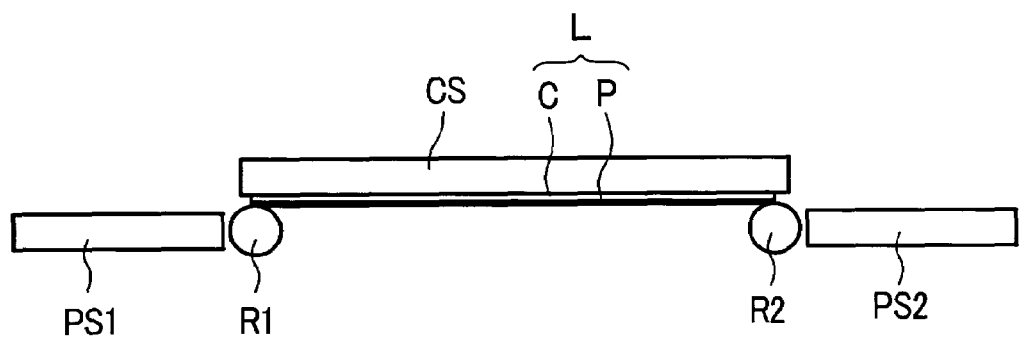
FIG. 5G is a cross-sectional view of a step succeeding a step shown in FIG. 5F.
Figure 5H:
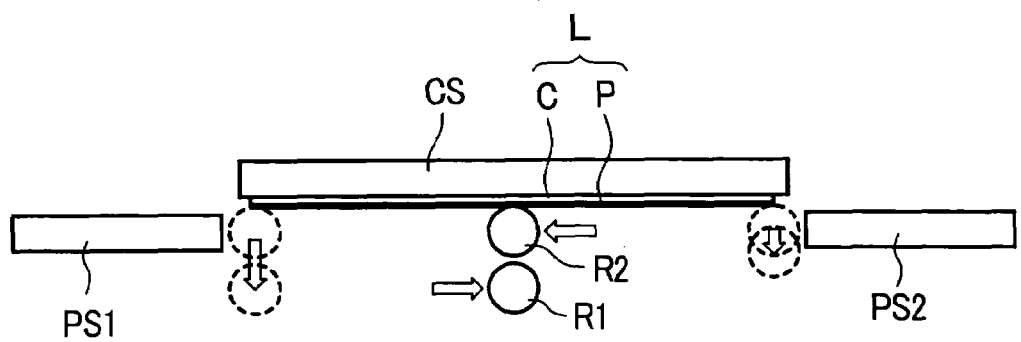
FIG. 5H is a cross-sectional view of a step succeeding a step shown in FIG. 5G.

Next, as shown in FIG. 5G, the lamination of the polarizer P to the liquid crystal cell C is finished to produce the liquid crystal display element L as a finished product. Thereafter, the laminating rollers R1, R2 are removed from the liquid crystal display element L in the downward direction as indicated by an arrow as shown in FIG. 5H. In such a state, although the liquid crystal display element L is discharged using an unloader (not shown in the drawing), this operation may be also performed manually. Thereafter, the laminating rollers R1, R2 are moved in the right direction and in the left direction respectively so as to return the manufacturing apparatus to the initial positions shown in FIG. 5A and the lamination of next liquid crystal cell C and polarizer P is performed.

According to this laminating method, it is possible to reduce the occurrence of defects such as the defect attributed to the fine bubbles at the lamination start position and the defect attributed to the pasting and the like among the drawbacks which are liable to occur in the currently available laminating method. Further, since the laminating operation is performed using two laminating rollers R1, R2, it is possible to obtain an advantageous effect that the high-speed production which can reduce a tact time thereof to one half of a tact time which can be realized with the above-mentioned embodiment 1 shown in FIG. 4 can be realized. Here, the laminating means is not limited to two rollers consisting of rollers R1, R2. That is, provided that an area for installing the laminating mechanism is ensured, the laminating operation may be performed using a larger number of rollers so as to further enhance the tact time.

Embodiment 3

FIG. 6 is a cross-sectional view for explaining still another embodiment of the laminating method and the lamination apparatus for laminating the polarizer P to the liquid crystal cell C in the manufacturing method and the manufacturing apparatus of the display device according to the present invention, wherein FIG. 6A to FIG. 6H show laminating steps.

Figure 6A:
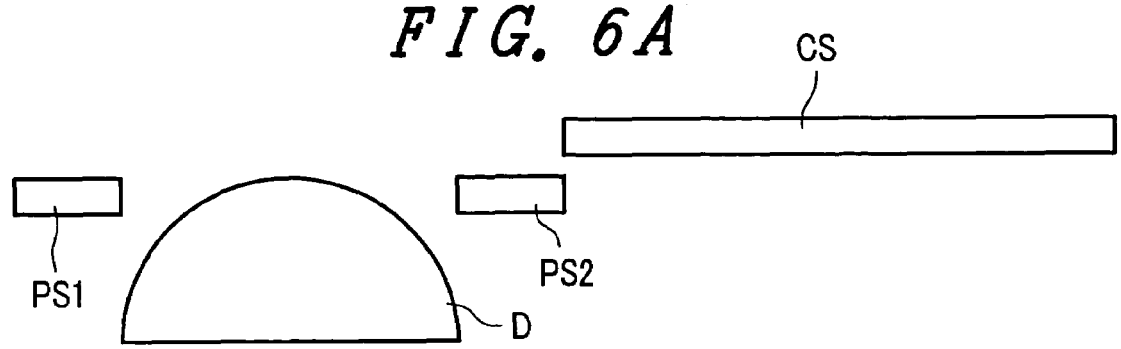
FIG. 6A is a cross-sectional view showing the constitution according to an embodiment 3 of a manufacturing apparatus used in a manufacturing method of a display device according to the present invention.

FIG. 6A is a cross-sectional view for explaining the positional relationship of the lamination apparatus before the liquid crystal cell C and the polarizer P according to the embodiment 3 of the present invention are mounted on the lamination apparatus. As shown in FIG. 6A, at given positions in the inside of the lamination apparatus, a suction stage CS which is provided for mounting the liquid crystal cell C thereon and a suction stage PS1 and a suction stage PS2 which are provided for mounting the polarizer P thereon are arranged in a parallel state as well as in a standby state. Further, at the center of the suction stage PS1 and the suction stage PS2 for the polarizer P, a laminating semi-cylindrical member D which pushes the polarizer P to the liquid crystal cell C during the laminating operation is tiltably arranged. Further, the liquid crystal cell C and the polarizer P are arranged at positions which do not interfere with each other in the vertical direction such that the liquid crystal cell C and the polarizer P can be positioned and set at the respective suction stages CS, PS1, PS2. Although the positioning and the setting of the liquid crystal cell C and the polarizer P are performed using respectively different mechanisms (not shown in the drawing), the positioning and setting may be performed manually.

Figure 6B:
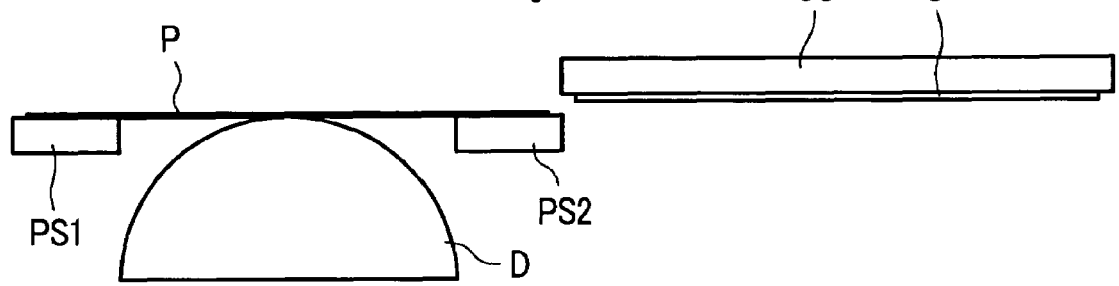
FIG. 6B is a cross-sectional view for explaining a laminating method of a liquid crystal cell and a polarizer for explaining an embodiment 3 of the manufacturing method of the display device according to the present invention.
Figure 6C:
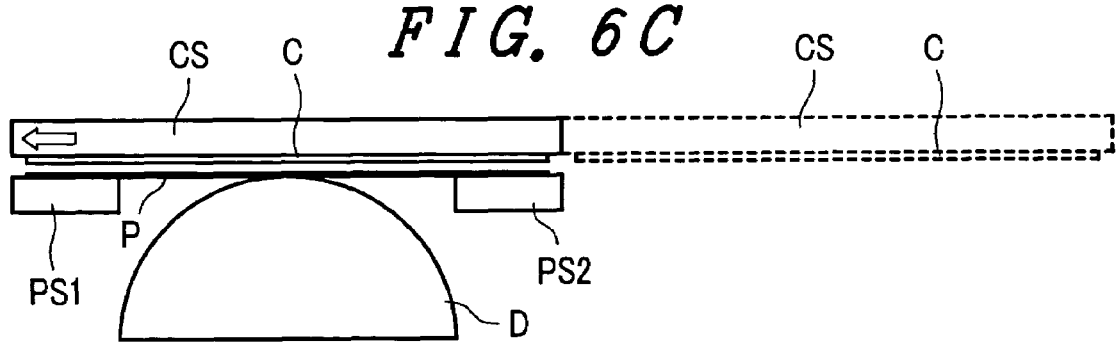
FIG. 6C is a cross-sectional view of a step succeeding a step shown in FIG. 6B.

First of all, as shown in FIG. 6B, the liquid crystal cell C is positioned and set at a given position below the suction stage CS and is further held and mounted on the suction stage CS by vacuum suction, while the polarizer P is positioned and set at a given position above the suction stages PS1, PS2 and the laminating semi-cylindrical member D and is further held and mounted on the suction stages PS1, PS2 by vacuum suction. Next, as shown in FIG. 6C, the suction stage CS which mounts the liquid crystal cell C thereon is moved in the left direction as indicated by an arrow to a given position above the suction stages PS1, PS2 which mount the polarizer P thereon.

Figure 6D:
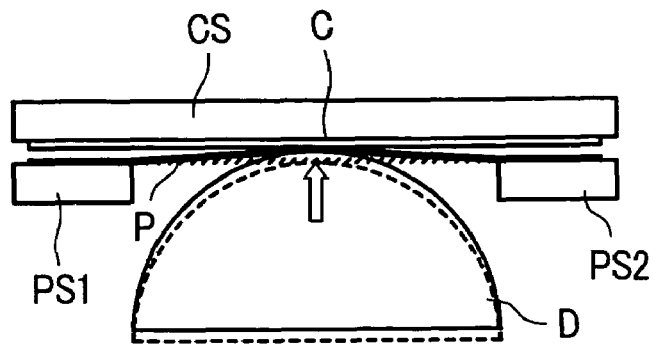
FIG. 6D is a cross-sectional view of a step succeeding a step shown in FIG. 6C.

Next, as shown in FIG. 6D, without moving the suction stages PS1, PS2 which mount the polarizer P thereon, due to the movement in the upward direction indicated by an arrow of the laminating semi-cylindrical member D which is positioned at the center between the suction stages PS1, PS2, the polarizer P is pushed and is brought into contact with the center of the liquid crystal cell C mounted on the suction stage CS which is arranged above the polarizer P so that the liquid crystal cell C and the polarizer P are laminated to each other in a narrow strip-like area.

Figure 6E:
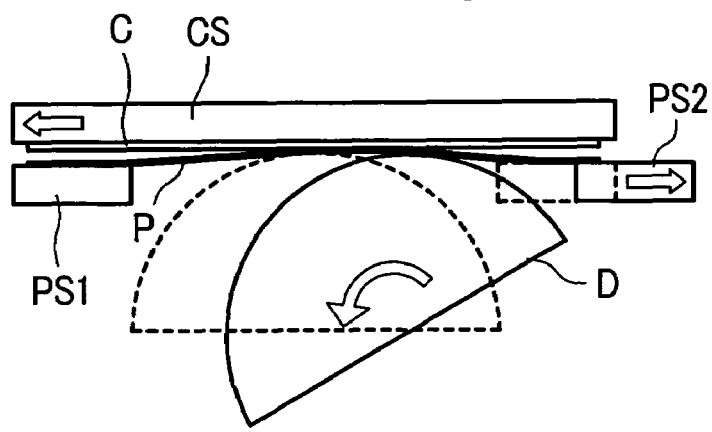
FIG. 6E is a cross-sectional view of a step succeeding a step shown in FIG. 6D.
Figure 6F:
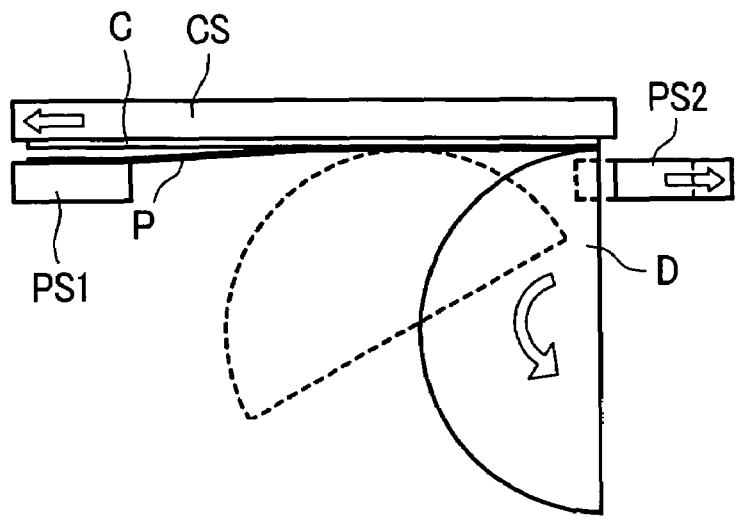
FIG. 6F is a cross-sectional view of a step succeeding a step shown in FIG. 6E.

Next, as shown in FIG. 6E, by moving the suction stage CS which mounts the liquid crystal cell C thereon in the left direction indicated by an arrow, the laminating semi-cylindrical member D is rotated in the direction indicated by an arrow in synchronism with the liquid crystal cell C mounted on the suction stage CS so as to move the suction stage PS2 which sucks a right half of the polarizer P in the right direction indicated by an arrow relatively with respect to the liquid crystal cell C. In such an operation, the polarizer P is gradually moved away from the suction stage PS2 while sliding on the suction stage PS2 and is eventually removed from the suction stage PS2 as shown in FIG. 6F so that the right half of the polarizer P is laminated to a right half of the liquid crystal cell C.

Here, a suction force of the suction stage PS2 with respect to the polarizer P is preliminarily adjusted to a level that the suction stage PS2 does not damage the polarizer P. Further, if there arises no significant problem in terms of quality, after the liquid crystal cell C and the polarizer P are laminated with each other with the narrow strip-like area, the suction may be released. Further, it is possible to dynamically control the suction force by mounting a sensor such that a proper tension is applied to the polarizer P. To prevent a phenomenon that air is retained between the liquid crystal cell C and the polarizer P so as to form bubbles, the laminating semi-cylindrical member D is rotated in synchronism with the movement of the suction stage CS so as to push the polarizer P to the liquid crystal cell C.

Figure 6G:
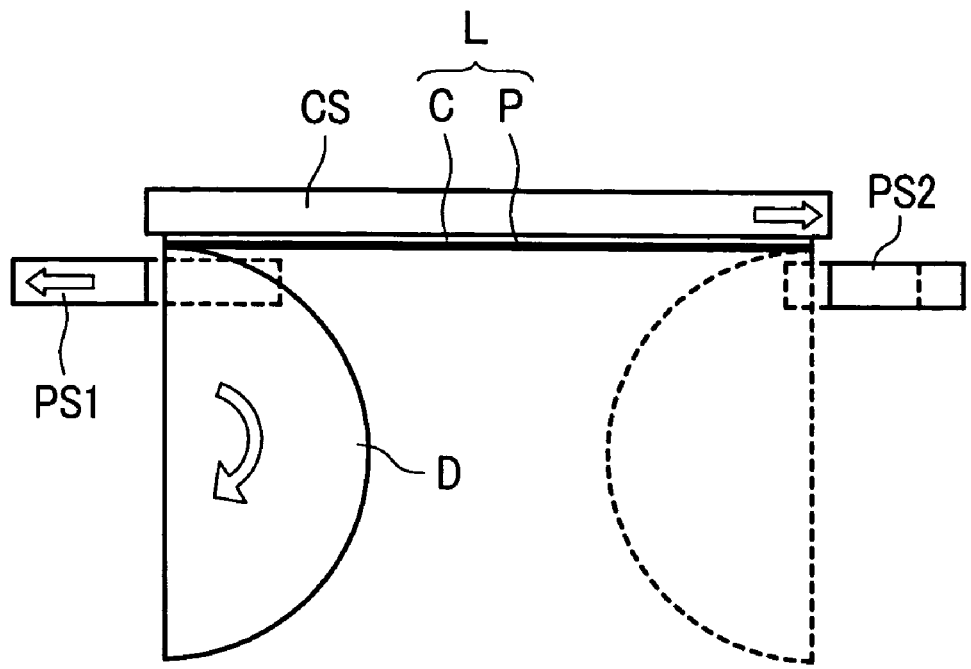
FIG. 6G is a cross-sectional view of a step succeeding a step shown in FIG. 6F.

Next, with respect to the suction stage CS which finishes the lamination of the right halves of the liquid crystal cell C and the polarizer P, when the suction stage CS is moved in the right direction indicated by an arrow in such a posture, as shown in FIG. 6G, the laminating semi-cylindrical member D is, this time, rotated in the clockwise direction indicated by an arrow in synchronism with the movement of the suction stage CS so as to laminate the polarizer P to the liquid crystal cell C. From a point of time that the suction stage CS gets over the vicinity of the center of the liquid crystal cell C and performs the lamination step for laminating left halves of the liquid crystal cell C and the polarizer P, the suction stage PS1 is moved in the left direction indicated by an arrow.

Accordingly, the polarizer P is gradually moved away from the suction stage PS1 while sliding on the suction stage PS1 and the polarizer P is eventually removed from the suction stage PS1 so that the left half of the polarizer P is laminated to the left half of the liquid crystal cell C whereby the lamination step is finished. During such an operation, since the lamination is performed while applying the proper tension to the polarizer P, the polarizer P slides on the suction stage PS1 along with the movement of the suction stage CS.

Figure 6H:
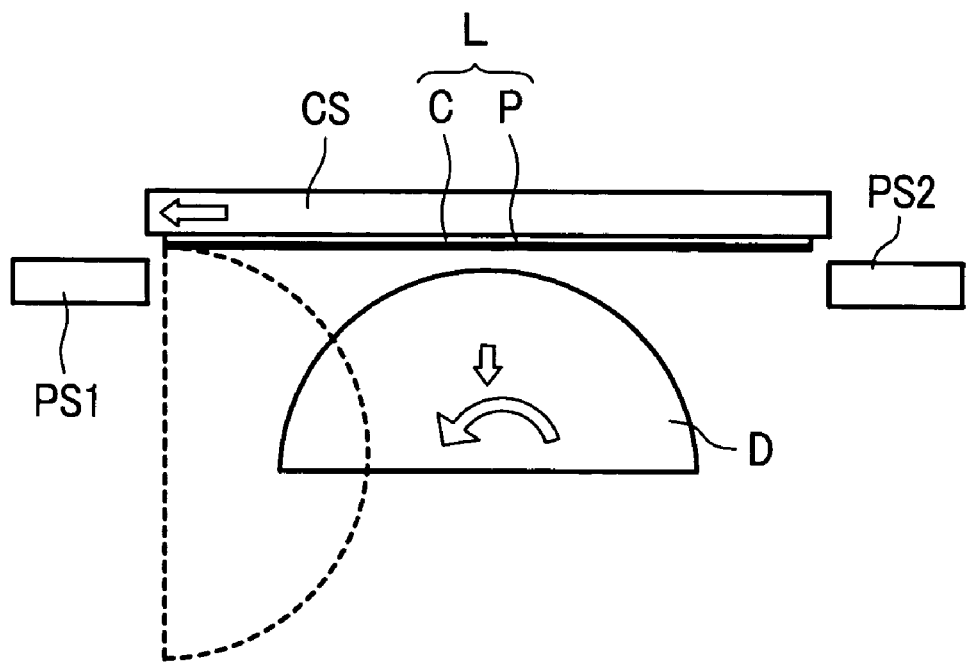
FIG. 6H is a cross-sectional view of a step succeeding a step shown in FIG. 6G.

In this manner, the lamination of the polarizer P to the liquid crystal cell C is finished to produce the liquid crystal display element L as a finished product. Thereafter, the laminating semi-cylindrical member D is removed from the liquid crystal display element L by moving the laminating semi-cylindrical member D in the downward direction indicated by an arrow as shown in FIG. 6H. In such a state, although the liquid crystal display element L is discharged using an unloader (not shown in the drawing), this operation may be also performed manually. Thereafter, the mounting apparatus is returned to the initial positions shown in FIG. 6A and the lamination of next liquid crystal cell C and polarizer P is performed.

According to this laminating method, by performing the laminating operation using the laminating semi-cylindrical member D in place of the laminating rollers R1, R2 shown in FIG. 4 and FIG. 5, it is possible to reduce the occurrence of defects such as the defect attributed to the fine bubbles at the lamination start position and the defect attributed to the pasting and the like among the drawbacks which are liable to occur in the currently available laminating method. Further, according to the manufacturing apparatus of this embodiment, it is possible to simplify the structure of the lamination apparatus compared to the corresponding lamination apparatus of the embodiments 1, 2 shown in FIG. 4 and FIG. 5.

Embodiment 4

FIG. 7 is a cross-sectional view for explaining still another embodiment of the laminating method and the lamination apparatus for laminating the polarizer P to the liquid crystal cell C in the manufacturing method and the manufacturing apparatus of the display device according to the present invention, wherein FIG. 7A to FIG. 7G show laminating steps. This embodiment is provided for further enhancing the tact time of the manufacturing method and for further simplifying the manufacturing apparatus compared with the above-mentioned embodiment 3 which is explained in conjunction with FIG. 6.

Figure 7A:
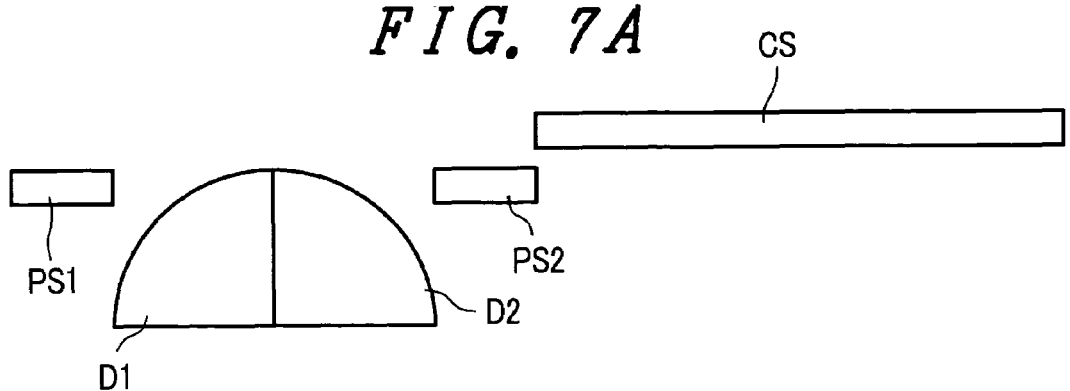
FIG. 7A is a cross-sectional view showing the constitution according to an embodiment 4 of a manufacturing apparatus used in a manufacturing method of a display device according to the present invention.

FIG. 7A is a cross-sectional view for explaining the positional relationship of the lamination apparatus before the liquid crystal cell C and the polarizer P according to the embodiment 4 are mounted on the lamination apparatus. As shown in FIG. 7A, a suction stage CS which is provided for holding the liquid crystal cell C and a suction stage PS1 and a suction stage PS2 which are provided for holding the polarizer P are arranged in a parallel state as well as in a standby state. Further, at the center of the suction stage PS1 and the suction stage PS2 for the polarizer P, two laminating quarter-cylindrical members D1, D2 which push the polarizer P to the liquid crystal cell C during the laminating operation are tiltably arranged in parallel.

Further, the liquid crystal cell C and the polarizer P stand by at positions which do not interfere with each other in the vertical direction such that the liquid crystal cell C and the polarizer P can be positioned and set at the respective suction stages CS, PS1, PS2. Although the positioning and the setting of the liquid crystal cell C and the polarizer P are performed using respectively different mechanisms (not shown in the drawing), the positioning and setting may be performed manually.

Figure 7B:
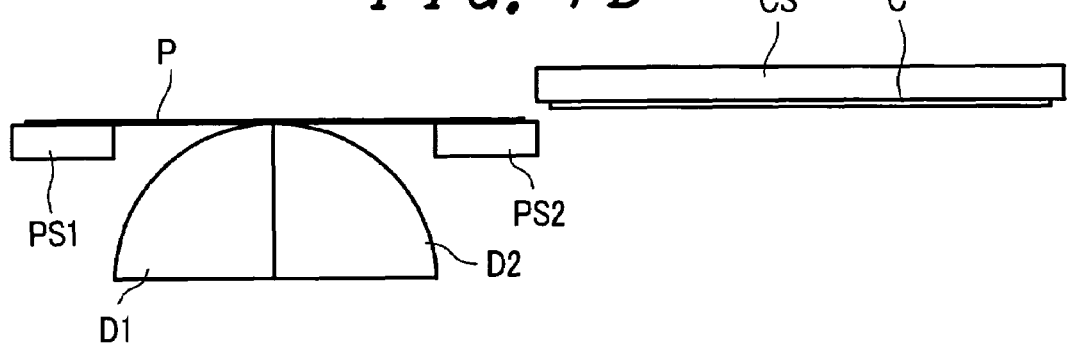
FIG. 7B is a cross-sectional view for explaining a laminating method of a liquid crystal cell and a polarizer for explaining an embodiment 4 of the manufacturing method of the display device according to the present invention.
Figure 7C:
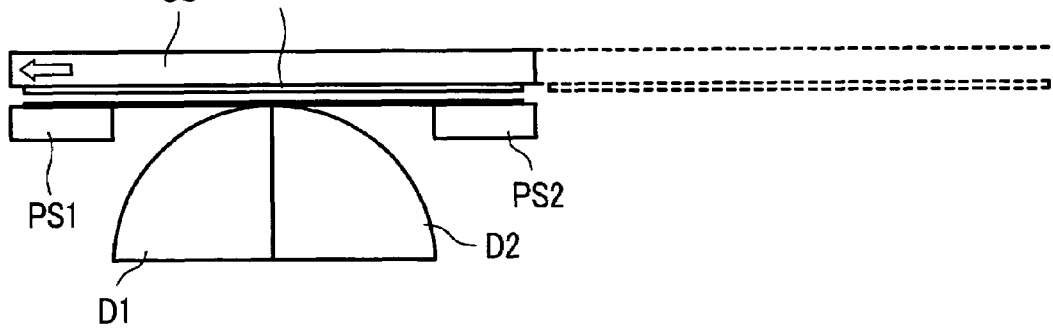
FIG. 7C is a cross-sectional view of a step succeeding a step shown in FIG. 7B.

First of all, as shown in FIG. 7B, the liquid crystal cell C is positioned and set at a given position below the suction stage CS and is further held and mounted on the suction stage CS by vacuum suction, while the polarizer P is positioned and set at a given position above the suction stages PS1, PS2 and the laminating quarter-cylindrical members D1, D2 and is further held and mounted on the suction stages PS1, PS2 by vacuum suction. Next, as shown in FIG. 7C, the suction stage CS which mounts the liquid crystal cell C thereon is moved in the left direction as indicated by an arrow to a given position above the suction stages PS1, PS2 which mount the polarizer P thereon.

Figure 7D:
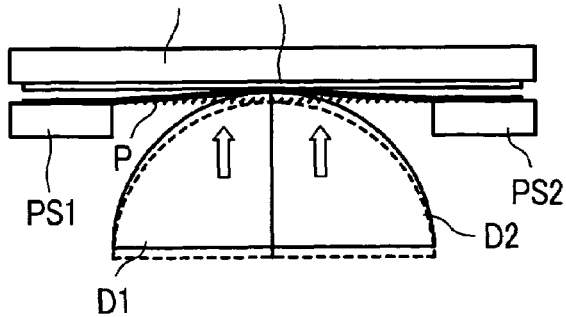
FIG. 7D is a cross-sectional view of a step succeeding a step shown in FIG. 7C.

Next, as shown in FIG. 7D, without moving the suction stages PS1, PS2 which mount the polarizer P thereon, due to the movement in the upward direction indicated by an arrow of the laminating quarter-cylindrical members D1, D2 which are positioned at the center between the suction stages PS1, PS2, the polarizer P is pushed and is brought into contact with the center of the liquid crystal cell C mounted on the suction stage CS which is arranged above the polarizer P so that the liquid crystal cell C and the polarizer P are laminated to each other in a narrow strip-like area.

Figure 7E:
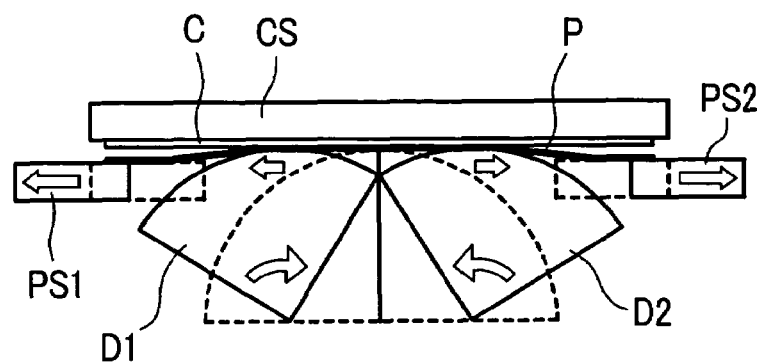
FIG. 7E is a cross-sectional view of a step succeeding a step shown in FIG. 7D.
Figure 7F:
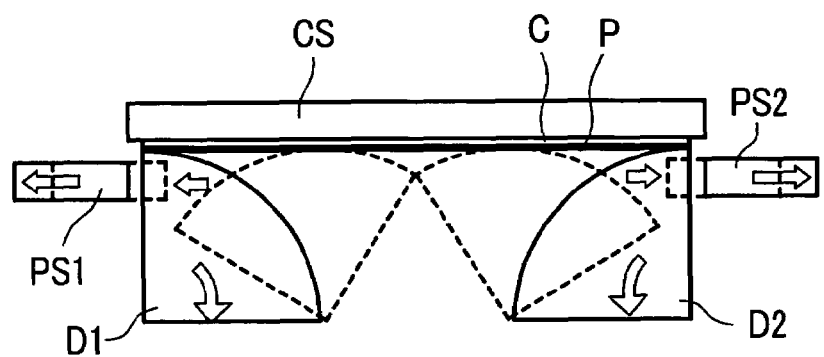
FIG. 7F is a cross-sectional view of a step succeeding a step shown in FIG. 7E.

Next, as shown in FIG. 7E, while fixing the position of the suction stage CS which mounts the liquid crystal cell C thereon, the laminating quarter-cylindrical members D1, D2 are rolled respectively in the clockwise direction and in the counterclockwise direction as indicated by arrows so as to simultaneously move the suction stages PS2, PS1 which suck a right half and a left half of the polarizer P respectively in the right direction and in the left direction indicated by arrows. In such an operation, the polarizer P is gradually moved away from the suction stages PS1, PS2 while sliding on the suction stage PS1, PS2 and is eventually removed from the suction stage PS1, PS2 as shown in FIG. 7F so that the polarizer P is laminated to the liquid crystal cell C. In this manner, the laminating quarter-cylindrical members D1, D2 can simultaneously laminate the polarizer P to the liquid crystal cell C and hence, the tact time can be enhanced.

Figure 7G:
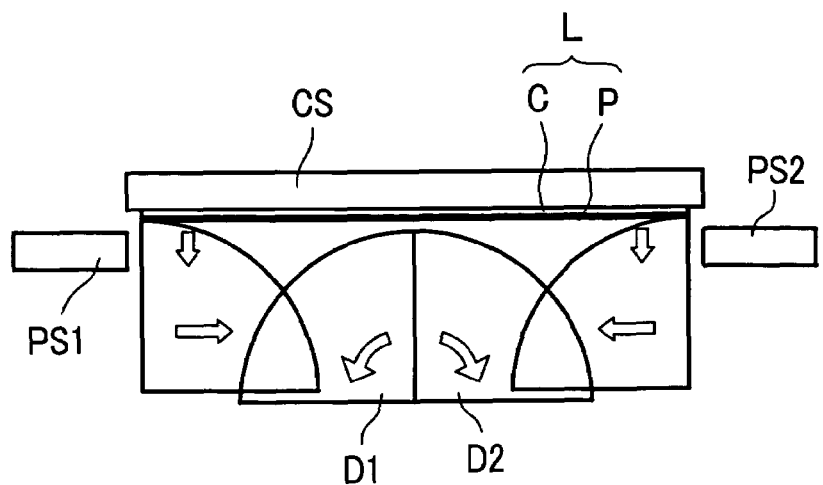
FIG. 7G is a cross-sectional view of a step succeeding a step shown in FIG. 7F.

Next, the lamination of the polarizer P to the liquid crystal cell C is finished to produce the liquid crystal display element L as a finished product as shown in FIG. 7G. Thereafter, the laminating quarter-cylindrical members D1, D2 are removed from the liquid crystal display element L by moving the laminating quarter-cylindrical members D1, D2 in the right direction and in the left direction as indicated by arrows shown in FIG. 7H. In such a state, although the liquid crystal display element L is discharged using an unloader (not shown in the drawing), this operation may be also performed manually. Thereafter, the lamination apparatus is returned to the initial positions shown in FIG. 7A and the lamination of next liquid crystal cell C and polarizer P is performed.

According to this laminating method, it is possible to reduce the occurrence of defects such as the defect attributed to the fine bubbles at the lamination start position and the defect attributed to the pasting and the like among the drawbacks which are liable to occur in the currently available laminating method.

Further, since the laminating operation is performed using two laminating quarter-cylindrical members D1, D2, it is possible to obtain an advantageous effect that the high-speed production which can reduce a tact time thereof to one half of a tact time which can be realized with the above-mentioned embodiment 3 shown in FIG. 6 can be realized. Still further, according to the manufacturing apparatus of this embodiment, it is possible to simplify the structure of the lamination apparatus compared to any one of corresponding lamination apparatus shown in FIG. 4 to FIG. 6. Here, the laminating means is not limited to two laminating quarter-cylindrical members. That is, provided that an area for installing the laminating mechanism is ensured, the laminating operation may be performed using a larger number of laminating quarter-cylindrical members so as to further enhance the tact time. Still further, provided that the suction control of the polarizer P can be performed using the laminating quarter-cylindrical members D1, D2, the suction stages PS1, PS2 can be omitted.

Embodiment 5

Figure 8:
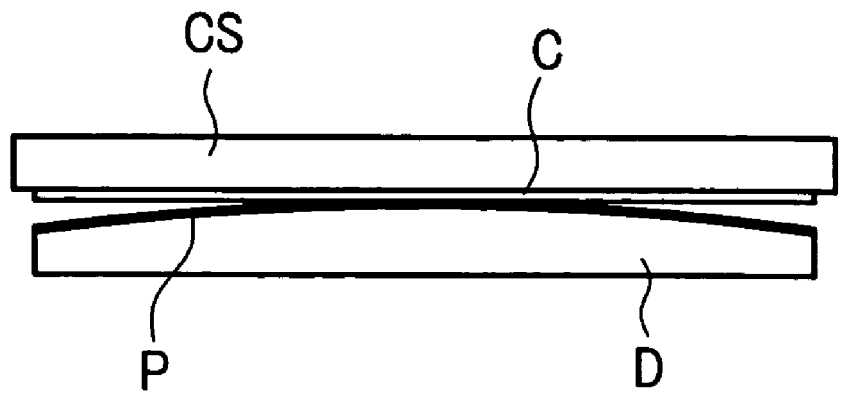
FIG. 8 is a cross-sectional view showing the constitution according to an embodiment 5 of a manufacturing apparatus used in a manufacturing method of a display device according to the present invention.

FIG. 8 is a cross-sectional view showing the constitution of the lamination apparatus when the radius of curvature of the laminating cylindrical member D explained in conjunction with FIG. 6 and FIG. 7 is further increased to approximate a flat surface. In the lamination apparatus shown in FIG. 8, below the liquid crystal cell C which is mounted on the suction stage CS, the laminating cylindrical member D having a function of mounting the polarizer P by vacuum suction is arranged, and the polarizer P which is mounted on the cylindrical laminating member D is brought into contact with and is pushed and laminated to the liquid crystal cell C arranged above the polarizer P. It is also possible to enhance the tact time by dividing the laminating quarter-cylindrical member D into the quarter cylindrical laminating members D1, D2 as shown in FIG. 7 thus enabling the simultaneous lamination of respective right halves and left halves of the liquid crystal cell C and the polarizer P.

According to the lamination apparatus having such a constitution, it is possible to provide the lamination apparatus having the more compact and simplified constitution compared to the lamination apparatus of the above-mentioned embodiments 1 to 4. Further, the initial contact area between the liquid crystal cell C and the polarizer P can be increased and hence, it is possible to overcome a defect which has been considered as a drawback in the currently available laminating method and the lamination apparatus. That is, it is possible to overcome the defect that thicknesses of the polarizer P and the adhesive agent A applied to the polarizer P are delicately changed due to an impact force of laminating means and the change appears as the visual irregularities at the initial contact point in the liquid crystal display element L.

Embodiment 6

Figure 9:
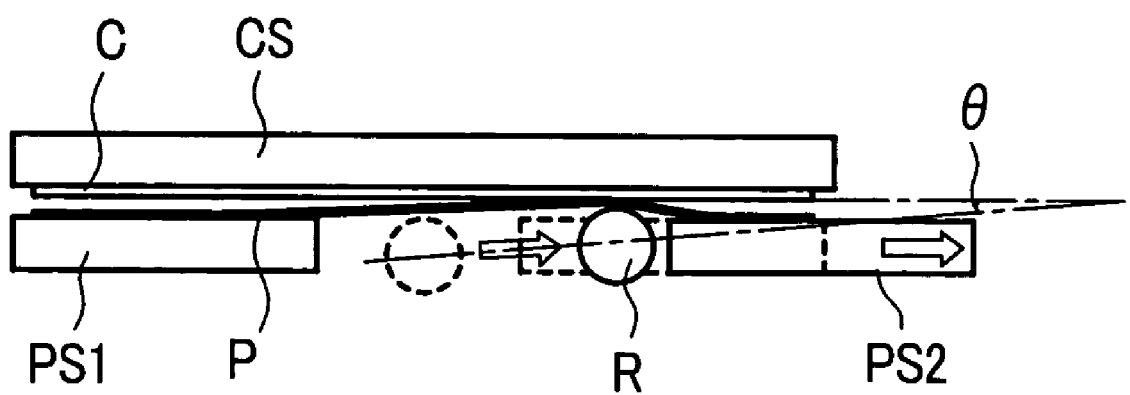
FIG. 9 is a cross-sectional view showing the constitution according to an embodiment 6 of a manufacturing apparatus used in a manufacturing method of a display device according to the present invention.

FIG. 9 is a cross-sectional view for explaining another embodiment which describes the manufacturing method which can overcome the defect that thicknesses of the polarizer P and the adhesive agent A applied to the polarizer P are delicately changed due to an impact force of laminating means and the change appears as the visual irregularities at the initial contact point in the liquid crystal display element L. To take the above-mentioned embodiment 1 as an example, the polarizer P which is mounted on the suction stages PS1, PS2 is firstly brought into pressure contact with the liquid crystal cell C mounted on the suction stage CS so as to start the elevation of the laminating roller R at the time of starting the lamination and, at the same time, the laminating roller R and the suction stage PS2 are moved in the right direction indicated by the arrow so as to form a contact angle θ at the point where the liquid crystal cell C and the polarizer P come into contact with each other firstly. This contact angle θ is an acute angle of approximately 45 degree or less.

In the actual use, by setting the contact angle θ to approximately 3 degrees or less, it is possible to reduce a defect ratio to approximately 1/3. In this manner, by setting the contact angle θ to the acute angle, it is possible to disperse the initial impact force by receiving the initial impact with a large area and hence, it is possible to overcome the defect that thicknesses of the polarizer P and the adhesive agent A applied to the polarizer P are delicately changed due to an impact force of laminating means and the change appears as the visual irregularities at the initial contact point in the liquid crystal display element L.

Here, in the above-mentioned respective embodiments, the explanation has been made with respect to the case in which the main surface to which the film is laminated is the main surface of the display panel made of glass. However, it is needless to say that the present invention is not limited to such a case and advantageous effects which are exactly same as the above-mentioned advantageous effects can be obtained by applying the present invention to a display panel made of light transmitting resin.

Further, in the above-mentioned respective embodiments, the explanation has been made with respect to the case in which a rectangular plane is applied to the main surface of the display panel, the laminating surface of the film or both of the main surface of the display panel and the laminating surface of the film. However, it is needless to say that the present invention is not limited to such a case and advantageous effects which are exactly same as the above-mentioned advantageous effects can be obtained by applying the present invention to the main surface of the display panel, the laminating surface of the film or both of the main surface of the display panel having an elongated circular shape, an elliptical shape, a strip-like shape or other similar shape.

Further, in the above-mentioned respective embodiments, the explanation has been made with respect to the case in which a resin-made polarizer is used as the film which is laminated to the main surface of the display panel. However, it is needless to say that the present invention is not limited to such a case and advantageous effects which are exactly same as the above-mentioned advantageous effects can be obtained by applying the present invention to a laminating method of a laminating film similar to the polarizer including a surface protective film, a filter film, an insulation film and the like.

Further, in the above-mentioned respective embodiments, the explanation has been made with respect to the case in which the present invention is applied to the liquid crystal display device as the display device. However, it is needless to say that the present invention is not limited to such a case and advantageous effects which are exactly same as the above-mentioned advantageous effects can be obtained by applying the present invention to various flat panel type display devices having an image display screen which is formed in a flat shape such as an inorganic EL display device, an organic EL display device, a FED and the like. For example, the present invention is applicable to a television receiver set, a personal computer, a monitor, a display and the like and can obtain the really same advantageous effects.

The invention claimed is:

1. A manufacturing apparatus of a display device which includes a display panel having a main surface which extends in the first direction and in the second direction which intersects the first direction and in which a cut film is laminated to the main surface of the display panel, the manufacturing apparatus of the display device comprising:

a display panel holding member which holds the display panel by way of a back surface thereof opposite to the main surface thereof and moves the display panel in the first direction;

a pair of film holding members which is arranged to face the display panel holding means in an opposed manner, includes a first holding plate and second holding plate which hold a back surface of a laminating surface of the cut film at at least two positions on a coplanar plane, and allows the first holding plate and the second holding plate to move along the coplanar plane; and at least one laminating member which is arranged between the first holding plate and the second holding plate of the pair of film holding members, brings a portion of the cut film into contact with the main surface of the display panel, and is movable in a reciprocating manner along the main surface of the display panel in synchronism with the movement of the first holding plate and the second holding plate.

2. A manufacturing apparatus of a display device according to claim 1, wherein after the portion of the film is brought into contact with the main surface of the display panel, the laminating member is moved along the main surface of the display panel in the first direction toward one end of the main surface of the display panel and, thereafter, the laminating member is moved along the main surface of the display panel in the first direction toward another end of the main surface of the display panel whereby the film is laminated to the main surface of the display panel.

3. A manufacturing apparatus of a display device according to claim 1, wherein the laminating member is a rotatable cylindrical roller.

4. A manufacturing apparatus of a display device according to claim 1, wherein the laminating member is a curved surface portion or a shape of a portion of the curved surface portion of a tiltable cylinder.

5. A manufacturing apparatus of a display device according to claim 1, wherein an angle of a motion that the laminating member brings the film into pressure contact with the main surface of the display panel is approximately 45 degrees or less with respect to the main surface of the display panel.

6. A manufacturing apparatus of a display device according to claim 2, wherein an angle of a motion that the laminating member brings the film into pressure contact with the main surface of the display panel is approximately 45 degrees or less with respect to the main surface of the display panel.

7. A manufacturing apparatus of a display device according to claim 3, wherein an angle of a motion that the laminating member brings the film into pressure contact with the main surface of the display panel is approximately 45 degrees or less with respect to the main surface of the display panel.

8. A manufacturing apparatus of a display device according to claim 3, wherein an angle of a motion that the laminating member brings the film into pressure contact with the main surface of the display panel is approximately 45 degrees or less with respect to the main surface of the display panel.

* * * * *